(12) United States Patent
Iwashita

(10) Patent No.: US 11,960,491 B2
(45) Date of Patent: Apr. 16, 2024

(54) STORAGE MEDIUM, PATTERN SEARCH DEVICE, AND PATTERN SEARCH METHOD

(71) Applicant: FUJITSU LIMITED, Kawasaki (JP)

(72) Inventor: Hiroaki Iwashita, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 26 days.

(21) Appl. No.: 17/676,926

(22) Filed: Feb. 22, 2022

(65) Prior Publication Data

US 2022/0171783 A1 Jun. 2, 2022

Related U.S. Application Data

(63) Continuation of application No. PCT/JP2019/038528, filed on Sep. 30, 2019.

(51) Int. Cl.
*G06F 16/2457* (2019.01)
*G06F 16/22* (2019.01)
(Continued)

(52) U.S. Cl.
CPC .... *G06F 16/24578* (2019.01); *G06F 16/2246* (2019.01); *G06F 16/248* (2019.01); *G06F 16/285* (2019.01); *G06N 7/01* (2023.01)

(58) Field of Classification Search
CPC .......... G06F 16/24578; G06F 16/2246; G06F 16/248; G06F 16/285; G06N 7/01; G06N 5/022
USPC ................. 707/723, 741, 748, 753, 797, 798
See application file for complete search history.

(56) References Cited

U.S. PATENT DOCUMENTS 7,716,229 B1 * 5/2010 Srivastava ............. G06Q 30/02
707/765
2005/0192960 A1 9/2005 Inakoshi et al.
(Continued)

FOREIGN PATENT DOCUMENTS

JP H06-068066 A 3/1994
WO 2004/040477 A1 5/2004

OTHER PUBLICATIONS

Extended European Search Report dated Aug. 12, 2022 for corresponding European Patent Application No. 19948043.5, 7 pages.
(Continued)

*Primary Examiner* — Phong H Nguyen
(74) *Attorney, Agent, or Firm* — Fujitsu Intellectual Property Center

(57) ABSTRACT

A non-transitory computer-readable storage medium storing a pattern search program that causes a computer to execute a process, the process includes designating priority ranks of each of attributes included in a plurality of attribute patterns that indicate one or more attributes, based on an inclusion relationship between occurrence sets of a plurality of samples with respect to each of the attributes included in the plurality of attribute patterns; and determining whether each of the plurality of attribute patterns is an emerging pattern according to a search order based on the priority ranks, when a frequency of occurrence of the plurality of samples in a first attribute pattern is less than the frequency of occurrence of the plurality of samples in a second attribute pattern that has all the attributes except one of the attributes with lowest one of the priority ranks among the attributes included in the first attribute pattern.

12 Claims, 24 Drawing Sheets

(51) Int. Cl.
  *G06F 16/248* (2019.01)
  *G06F 16/28* (2019.01)
  *G06N 7/01* (2023.01)

(56) References Cited

U.S. PATENT DOCUMENTS

| | | | | |
|---|---|---|---|---|
| 2010/0251210 | A1* | 9/2010 | Amaral | G06F 11/3616 717/104 |
| 2011/0246498 | A1* | 10/2011 | Forster | G06F 21/604 707/769 |
| 2012/0036149 | A1* | 2/2012 | Tsuboi | G06F 16/338 707/769 |
| 2018/0329983 | A1* | 11/2018 | Toda | G06N 5/02 |
| 2021/0224321 | A1* | 7/2021 | Chiarandini | G06F 16/738 |

OTHER PUBLICATIONS

Borah, Anindita et al., "Tree based frequent and rare pattern mining techniques: a comprehensive structural and empirical analysis", SN Applied Sciences, [Online], vol. 1, No. 9, Aug. 3, 2019, 18 pages, XP055949208, ISSN: 2523-3963, DOI: 10.1007/s42452-019-1043-x, Retrieved from the Internet: URL:https://link.springer.com/content/pdf/10.1007/s42452-019-1043-x.pdf [retrieved on Aug. 4, 2022].

A.M. Garcia-Vico et al., "An Overview of Emerging Pattern Mining in Supervised Descriptive Rule Discovery: Taxonomy, Empirical Study, Trends, and Prospects", WIREs Data Mining and Knowledge Discovery 2018, 8:e1231., doi: 10.1002/widm.1231, pp. 1-22, vol. 8, Jan./Feb. 2018 (First published: Oct. 18, 2017) (Total 22 pages).

James Bailey et al., "Fast Algorithms for Mining Emerging Patterns", PKDD 2002: Principles of Data Mining and Knowledge Discovery [online] Springer Link, pp. 39-50 (Retrieved on Oct. 29, 2019), Sep. 18, 2002 (Total 16 pages) Internet <URL:https://link.springer.com/chapter/10.1007/3-540-45681-3_4>] (Cited in ISR).

Yukinobu Hamuro et al., "Analysis of Web Access Log Data by Integration Overt Pattern Discrimination Model", Operations Research, vol. 53, No. 2, pp. 75-84, Feb. 1, 2008, Non-Official Translation: From the left column, line 21 on p. 79 to the left column, line 34 on p. 80 (Total 17 pages) (Cited in ISR).

Yoshitaka Kameya et al., "Mining Top-k Relevant Patterns Using Minimum Support Raising", JSAI(Japanese Society for Artificial Intelligence) Technical Report, SIG-DOCMAS-B101-4, [online] (Retrieval date: Oct. 18, 2017), Dec. 14, 2011 (Total 11 pages) Internet <URL:https://jsai.ixsq.nii.ac.jp/ej/?action=repository_uri&item_id=234&file_id=l&file_no=l>.

International Search Report and Written Opinion of the International Searching Authority (Form PCT/ISA/210, 220, and 237), mailed in connection with PCT/JP2019/038528 and dated Nov. 5, 2019 (Total 11 pages).

* cited by examiner

FIG. 13A

| ID | ATTRIBUTE |
|---|---|
| 1 | MARRIED |
| 2 | MALE, MARRIED |
| 3 | MALE, 30S, MARRIED |

FIG. 13B

| ID | ATTRIBUTE |
|---|---|
| 4 | NONE |
| 5 | MALE, MARRIED |
| 6 | MALE, 30S |

FIG. 14

| ATTRIBUTE PATTERN | OCCURRENCE SET (DP) | FREQUENCY OF OCCURRENCE (DP) | OCCURRENCE SET (DN) | FREQUENCY OF OCCURRENCE (DN) |
|---|---|---|---|---|
| NONE | 1,2,3 | 3 | 4,5,6 | 3 |
| MALE | 2,3 | 2 | 5,6 | 2 |
| 30S | 3 | 1 | 6 | 1 |
| MARRIED | 1,2,3 | 3 | 5 | 1 |
| MALE, 30S | 3 | 1 | 6 | 1 |
| MALE, MARRIED | 2,3 | 2 | 5 | 1 |
| 30S, MARRIED | 3 | 1 | NONE | 0 |
| MALE, 30S, MARRIED | 3 | 1 | NONE | 0 |

FIG. 18A

| ID | ATTRIBUTE |
|---|---|
| 1 | c,e |
| 2 | b,c,e |
| 3 | a,b,d |
| 4 | a,b,d |

FIG. 18B

| ID | ATTRIBUTE |
|---|---|
| 5 | d |
| 6 | c,d |
| 7 | a,b,c |
| 8 | a,b,c,d |

FIG. 20A

| ID | ATTRIBUTE |
|----|-----------|
| 3  | b,c       |
| 4  | b,c,d     |

FIG. 20B

| ID | ATTRIBUTE |
|----|-----------|
| 4  | b,c       |

FIG. 23A

| ID | ATTRIBUTE |
|---|---|
| 3 | c |
| 4 | c,d |

FIG. 23B

| ID | ATTRIBUTE |
|---|---|
| 4 | c |

STORAGE MEDIUM, PATTERN SEARCH DEVICE, AND PATTERN SEARCH METHOD

CROSS-REFERENCE TO RELATED APPLICATION

This application is a continuation application of International Application PCT/JP2019/038528 filed on Sep. 30, 2019 and designated the U.S., the entire contents of which are incorporated herein by reference.

FIELD

The present invention relates to a storage medium, a pattern search device, and a pattern search method.

BACKGROUND

In recent years, data mining has been actively performed to discover new findings by analyzing collected data. In such data mining, for example, pieces of data that match a predetermined condition is extracted from among a plurality of pieces of data each having an attribute, and furthermore, a characteristic tendency common among the extracted pieces of data is specified to discover new findings.

Specifically, in the above-mentioned data mining, for example, new findings are discovered by extracting an attribute pattern (hereinafter, also referred to as "emerging pattern") that causes occurrences at a high frequency in data that satisfies the target condition and causes occurrences at a low frequency in data that does not satisfy the target condition (see, for example, Non-Patent Document 1).

Non-Patent Document 1: A. M. Garcia-Vico et al., "An overview of emerging pattern mining in supervised descriptive rule discovery: taxonomy, empirical study, trends, and prospects", WIREs Data Mining and Knowledge Discovery 2018, 8: e1231, doi: 10.1002/widm.1231

SUMMARY

According to an aspect of the embodiments, a non-transitory computer-readable storage medium storing a pattern search program that causes at least one computer to execute a process, the process includes designating priority ranks of each of attributes included in a plurality of attribute patterns that indicate one or more attributes, based on an inclusion relationship between occurrence sets of a plurality of samples with respect to each of the attributes included in the plurality of attribute patterns; and determining whether each of the plurality of attribute patterns is an emerging pattern according to a search order based on the priority ranks, when a frequency of occurrence of the plurality of samples in a first attribute pattern is less than the frequency of occurrence of the plurality of samples in a second attribute pattern that has all the attributes except one of the attributes with lowest one of the priority ranks among the attributes included in the first attribute pattern.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13A and FIG. 13B are diagrams explaining a specific example of a data set D.

FIG. 14 is a diagram explaining a specific example of a table including an occurrence set and a frequency of occurrence of the data set D in attribute patterns.

FIG. 18A and FIG. 18B are diagrams explaining a specific example of the data set D.

FIG. 20A and FIG. 20B are diagrams explaining a specific example of the another pattern determination process described with reference to FIGS. 9 to 12.

FIG. 23A and FIG. 23B are diagrams explaining a specific example of the another pattern determination process described with reference to FIGS. 9 to 12.

DESCRIPTION OF EMBODIMENTS

In the above-mentioned data mining, there are cases where a restriction on the time from data collection to analysis is imposed depending on the use of the analysis result, or the like. In addition, the amount of data analyzed in data mining tends to increase year by year. Therefore, data mining as described above needs to be carried out as efficiently as possible.

However, the extraction of the emerging pattern performed in data mining is generally a process with a high calculation processing cost, and it sometimes takes a long time from data collection to analysis. Therefore, in companies, research institutes, and the like that perform data analysis, it is expected to reduce the calculation processing cost involved in extracting the emerging pattern.

Thus, in one aspect, it is an object of the present invention to provide a pattern search program, a pattern search device, and a pattern search method that enable reduction of a calculation processing cost involved in extracting an emerging pattern.

According to one aspect, reduction of a calculation processing cost involved in extracting an emerging pattern may be achieved.

[Configuration of Information Processing System]

Figure 1:
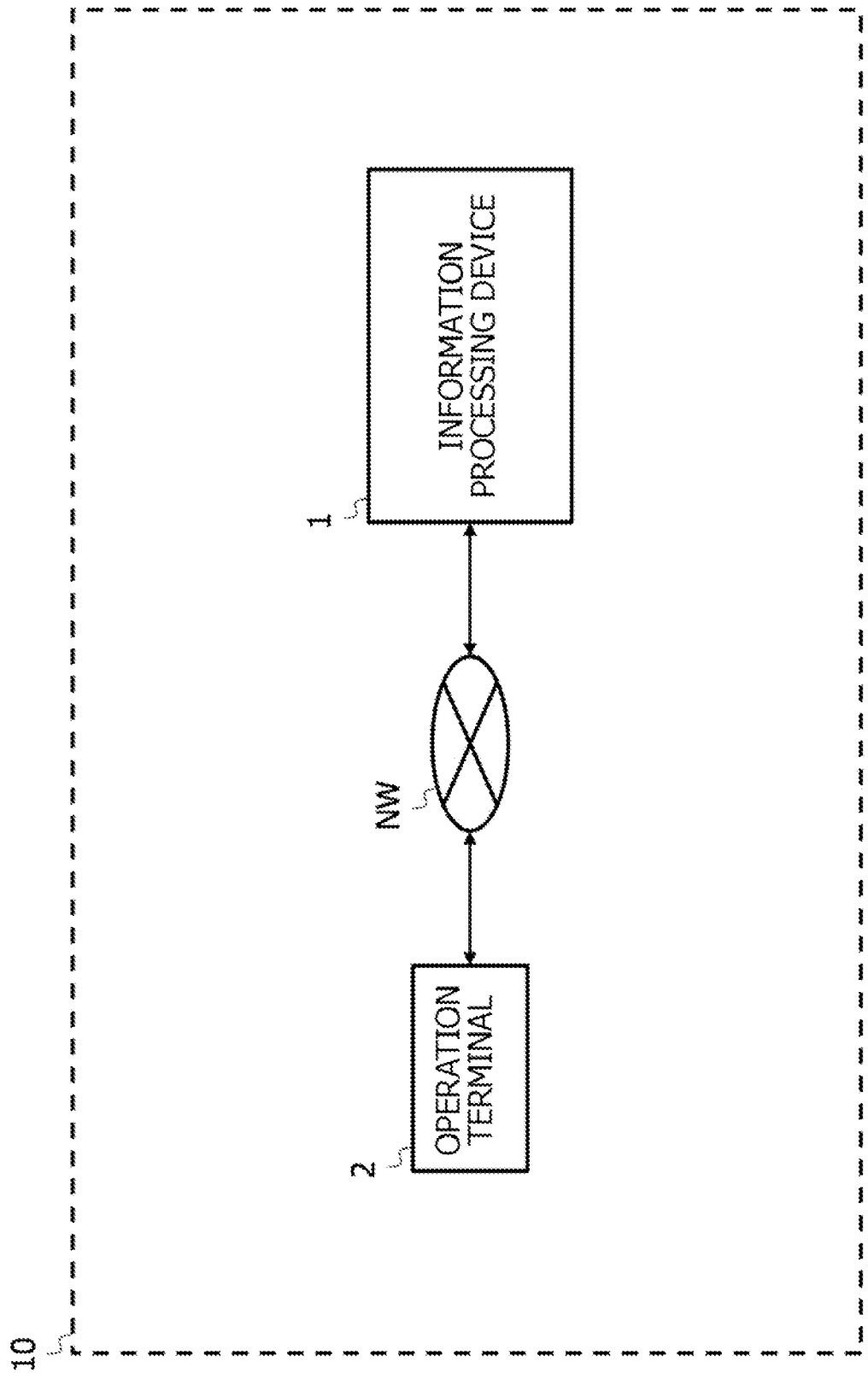
FIG. 1 is a diagram explaining a configuration of an information processing system 10.

First, a configuration of an information processing system 10 will be described. FIG. 1 is a diagram explaining a configuration of the information processing system 10.

As illustrated in FIG. 1, the information processing system 10 includes, for example, an information processing device 1 and an operation terminal 2. The information processing device 1 is connected to the operation terminal 2 via a network NW such as an Internet network.

In the example illustrated in FIG. 1, the information processing device 1 performs a determination as to whether or not each of attribute patterns included in a plurality of pieces of data (hereinafter, also referred to as a plurality of samples), for example, input via the operation terminal 2 is an emerging pattern.

Specifically, the information processing device 1 in the present embodiment designates the priority ranks of each of attributes included in a plurality of attribute patterns that each indicate one or more attributes, based on an inclusion relationship between occurrence sets of the plurality of samples with respect to each of the attributes included in the plurality of attribute patterns. Then, the information processing device 1 performs a determination as to whether or not each of the plurality of attribute patterns is an emerging pattern, in accordance with a search order based on the designated priority ranks. Note that the emerging pattern in the present embodiment means an attribute pattern that causes occurrences at a high frequency in data that satisfies the target condition and causes occurrences at a low frequency in data that does not satisfy the target condition.

Here, each time a determination as to whether or not each attribute pattern is an emerging pattern (hereinafter, also simply referred to as a determination) is performed, the information processing device 1 determines whether or not the frequency of occurrence of a plurality of samples in an attribute pattern (hereinafter, also referred to as a first attribute pattern) is equal to or higher than the frequency of occurrence of the plurality of samples in an attribute pattern (hereinafter, also referred to as a second attribute pattern) that has all the attributes except an attribute with the lowest priority rank among the attributes included in the first attribute pattern. Then, when it is determined that the frequency of occurrence corresponding to the first attribute pattern is equal to or higher than the frequency of occurrence corresponding to the second attribute pattern, the information processing device 1 does not perform the determination for the first attribute pattern.

For example, when the frequency of occurrence of the first attribute pattern is not decreased from the frequency of occurrence of the second attribute pattern, the information processing device 1 in the present embodiment determines that the first attribute pattern is not an emerging pattern that includes no other emerging patterns (hereinafter, also referred to as a minimal emerging pattern). Therefore, when the processing purpose is to extract the minimal emerging pattern, in response to the detection of the fact that the frequency of occurrence of the first attribute pattern is not decreased from the frequency of occurrence of the second attribute pattern, the information processing device 1 omits to make a determination for the first attribute pattern.

Furthermore, the information processing device 1 in the present embodiment rearranges each attribute (designates the priority ranks of each attribute) included in the plurality of attribute patterns in advance in order to create a large number of first attribute patterns for which it is feasible to omit making a determination as described above.

This allows the information processing device 1 to reduce the calculation processing cost involved in extracting the emerging pattern. Specifically, the information processing device 1 may reduce the calculation processing cost involved in extracting the minimal emerging pattern.

[Hardware Configuration of Information Processing System]

Figure 2:
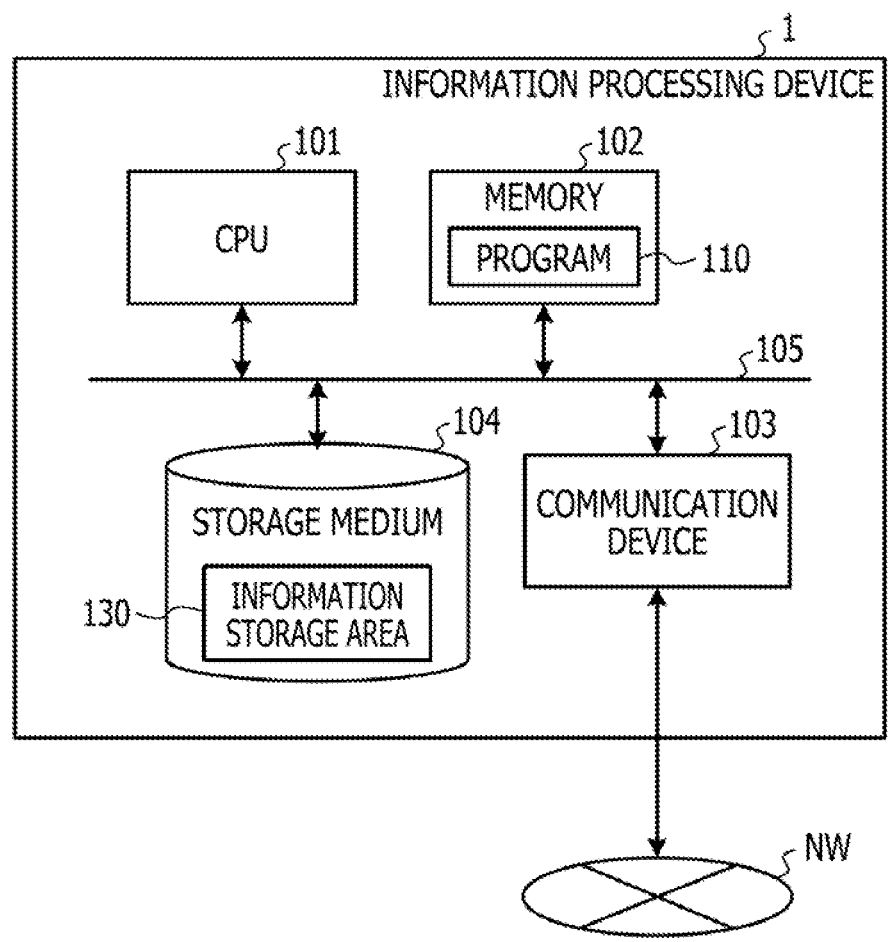
FIG. 2 is a diagram explaining a hardware configuration of an information processing device 1.

Next, a hardware configuration of the information processing system 10 will be described. FIG. 2 is a diagram explaining a hardware configuration of the information processing device 1.

As illustrated in FIG. 2, the information processing device 1 includes a central processing unit (CPU) 101, which is a processor, a memory 102, a communication device 103, and a storage medium 104. The respective units are interconnected via a bus 105.

The storage medium 104 includes, for example, a program storage area (not illustrated) that stores a program 110 for performing a process of searching for an emerging pattern (hereinafter, also referred to as a pattern search process). Furthermore, the storage medium 104 includes, for example, a storage unit 130 (hereinafter, also referred to as an information storage area 130) that stores information to be used when the pattern search process is performed. Note that the storage medium 204 may be, for example, a hard disk drive (HDD) or a solid state drive (SSD).

The CPU 101 executes the program 110 loaded from the storage medium 104 into the memory 102 to perform the pattern search process.

In addition, the communication device 103 communicates with, for example, the network NW.

[Functions of Information Processing System]

Figure 3:
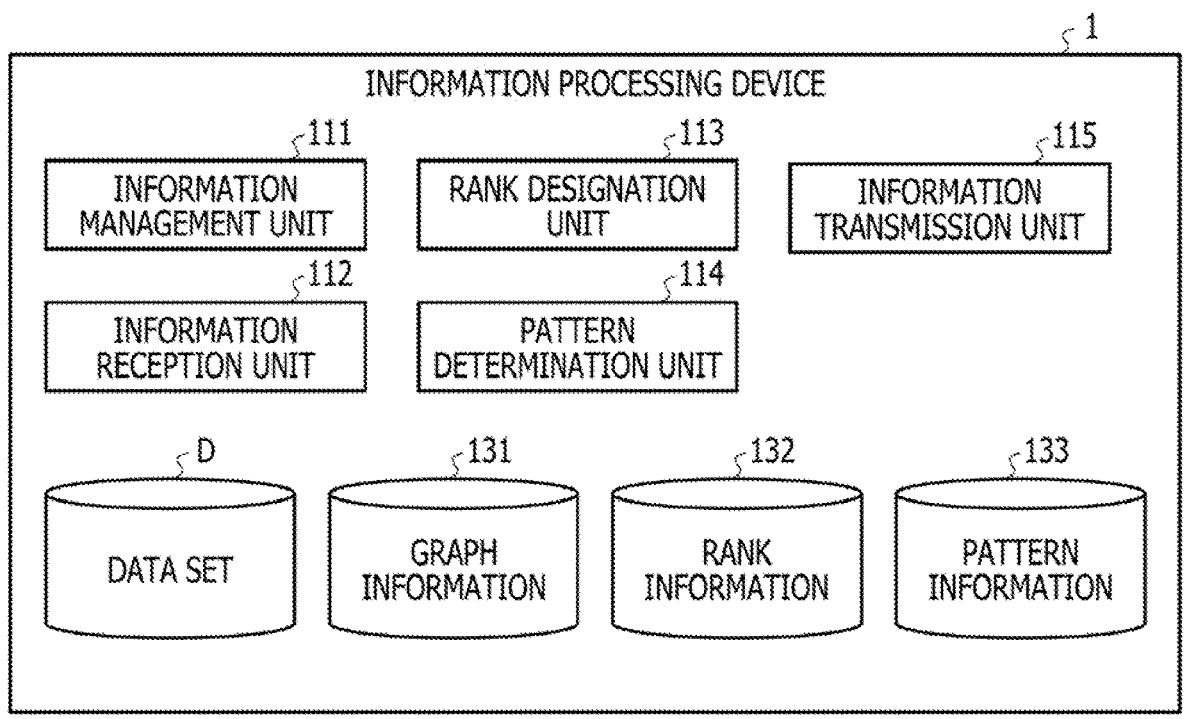
FIG. 3 is a block diagram of functions of the information processing device 1.

Next, functions of the information processing system 10 will be described. FIG. 3 is a block diagram of the functions of the information processing device 1.

As illustrated in FIG. 3, the information processing device 1 implements various functions including an information management unit 111, an information reception unit 112, a rank designation unit 113, a pattern determination unit 114, and an information transmission unit 115 through organic collaboration between hardware such as the CPU 101 and the memory 102 and the program 110, for example.

In addition, as illustrated in FIG. 3, the information processing device 1 stores a data set D including a plurality of samples, graph information 131, rank information 132, and pattern information 133 in the information storage area 130, for example.

The information management unit 111 stores the data set D input via the operation terminal 2 in the information storage area 130, for example.

The information reception unit 112 receives, for example, an instruction to start searching for an emerging pattern (hereinafter, also referred to as a search instruction). Specifically, the information reception unit 112 receives the search instruction input via the operation terminal 2, for example.

The rank designation unit 113 designates the priority ranks of each of attributes included in a plurality of attribute patterns, based on an inclusion relationship between occurrence sets of the plurality of samples with respect to each of the attributes included in the plurality of attribute patterns. Then, the information management unit 111 stores the rank information 132 indicating the priority ranks of each attribute designated by the rank designation unit 113, in the information storage area 130, for example.

The pattern determination unit 114 performs a determination as to whether or not each of the plurality of attribute patterns is an emerging pattern, in accordance with a search order based on the priority ranks designated by the rank designation unit 113. In this case, the pattern determination unit 114 determines whether or not the frequency of occurrence of the plurality of samples in the first attribute pattern is decreased from the frequency of occurrence of the plurality of samples in the second attribute pattern. Then, when it is determined that the frequency of occurrence corresponding to the first attribute pattern is not decreased from the frequency of occurrence corresponding to the second attribute pattern, the pattern determination unit 114 does not perform the determination for the first attribute pattern.

Thereafter, the pattern determination unit 114 specifies, for example, the minimal emerging pattern among the attribute patterns determined to be the emerging patterns. Then, the information management unit 111 stores the pattern information 133 indicating the attribute pattern determined by the pattern determination unit 114 to be the minimal emerging pattern, in the information storage area 130, for example.

The information transmission unit 115 transmits, for example, the pattern information 133 stored in the information storage area 130 to the operation terminal 2. A specific example of the graph information 131 will be described later.

First Embodiment

Next, a first embodiment will be described. FIGS. 4 to 12 are flowchart diagrams explaining the pattern search process according to the first embodiment. In addition, FIGS. 13 to 24 are diagrams explaining details of the pattern search process according to the first embodiment.

[Specific Example of Data Set]

First, a specific example of the data set D in the first embodiment will be described. FIG. 13A and FIG. 13B are diagrams explaining a specific example of the data set D. Specifically, FIG. 13A is a diagram explaining a specific example of a data set DP including samples of positive examples (samples that satisfy the target condition), as a part of the data set D. In addition, FIG. 13B is a diagram explaining a specific example of a data set DN including samples of negative examples (samples that do not satisfy the target condition), as a part of the data set D.

The data set D illustrated in FIG. 13A and FIG. 13B have, as items, an identifier ("ID") in which identification information of each sample included in the data set D is set and an "attribute" in which the attribute included in each sample is set.

Specifically, in the data set DP illustrated in FIG. 13A, "married" is set in the "attribute" of a sample whose "ID" is "1". In addition, "male" and "married" are set in the "attri-bute" of a sample whose "ID" is "2", and "male", "30s", and "married" are set in the "attribute" of a sample whose "ID" is "3".

Meanwhile, in the data set DN illustrated in FIG. 13B, "none" indicating that no attribute is set is set in the "attribute" of a sample whose "ID" is "4". In addition, "male" and "married" are set in the "attribute" of a sample whose "ID" is "5", and "male" and "30s" are set in the "attribute" of a sample whose "ID" is "6".

[Specific Examples of Occurrence Set and Frequency of Occurrence of Attribute Patterns]

Next, specific examples of the occurrence set and the frequency of occurrence of the data set D in attribute patterns will be described. FIG. 14 is a diagram explaining a specific example of a table including the occurrence set and the frequency of occurrence of the data set D in attribute patterns.

The table illustrated in FIG. 14 has, as an item, an "attribute pattern" in which identification information of each attribute pattern is set. In addition, the table illustrated in FIG. 14 has, as items, an "occurrence set (DP)" in which the "ID" of a sample including each of attributes set in the "attribute pattern" among samples included in the data set DP is set, and a "frequency of occurrence (DP)" in which the number of attributes set in the "occurrence set (DP)" is set. Furthermore, the table illustrated in FIG. 14 has, as items, an "occurrence set (DN)" in which the "ID" of a sample including each of attributes set in the "attribute pattern" among samples included in the data set DN is set, and a "frequency of occurrence (DN)" in which the number of attributes set in the "occurrence set (DN)" is set. Note that samples set with "none" in the "attribute pattern" (samples in the first row) are samples corresponding to an attribute pattern that includes no attribute.

Specifically, in the table illustrated in FIG. 14, for example, for samples whose "attribute pattern" is "none" (samples in the first row), "1", "2", and "3" are set as the "occurrence set (DP)", "3" is set as the "frequency of occurrence (DP)", "4", "5", and "6" are set as the "occurrence set (DN)", and "3" is set as the "frequency of occurrence (DN)".

In addition, in the table illustrated in FIG. 14, for example, for samples whose "attribute pattern" is "male" (samples in the second row), "2" and "3" are set as the "occurrence set (DP)", "2" is set as the "frequency of occurrence (DP)", "5" and "6" are set as the "occurrence set (DN)", and "2" is set as the "frequency of occurrence (DN)". The description of other data included in FIG. 14 will be omitted.

Note that, among respective samples included in the data set D, an occurrence set Occ(x, D) of samples having an attribute pattern x is worked out by following formula (1).

[Mathematical Formula 1]

$$Occ(x,D)=[S|S \in D, x \subseteq S] \quad \text{(Formula 1)}$$

In addition, a frequency of occurrence frq(x, D) of the respective samples included in the data set D in the attribute pattern x is worked out by following formula (2).

[Mathematical Formula 2]

$$frq(x,D)=|Occ(x,D)| \quad \text{(Formula 2)}$$

[Rank Designation Process (1)]

Figure 4:
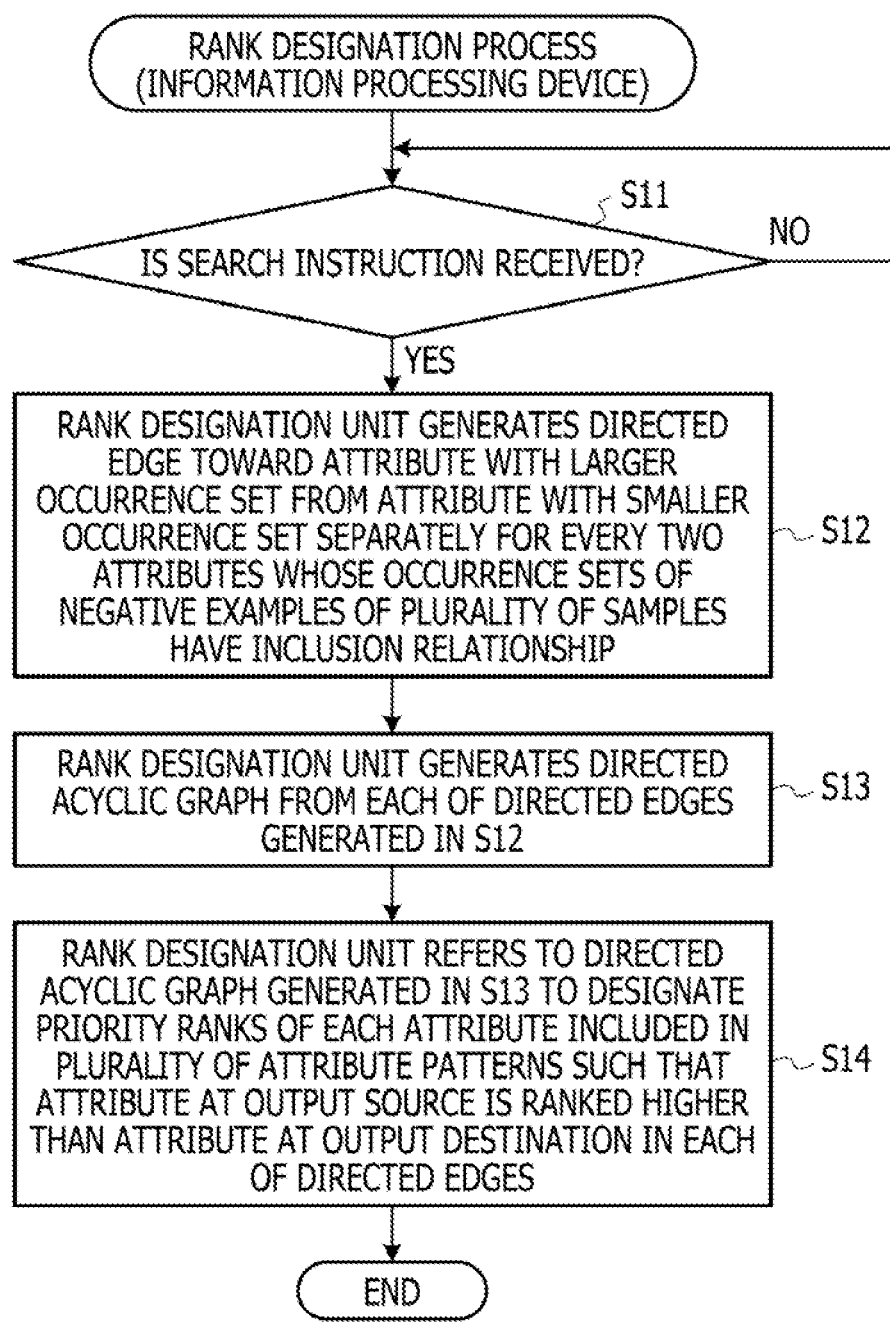
FIG. 4 is a flowchart diagram explaining a pattern search process according to a first embodiment.

Next, as a part of the pattern search process, a process of designating the priority ranks of each attribute included in a plurality of attribute patterns (hereinafter, also referred to as a rank designation process) will be described. FIG. 4 is a flowchart diagram explaining the rank designation process.

As illustrated in FIG. 4, the information reception unit 112 of the information processing device 1 waits until receiving a search instruction input via the operation terminal 2, for example (NO in S11).

Then, when the search instruction is received (YES in S11), separately for every two attributes whose occurrence sets of negative examples of a plurality of samples have an inclusion relationship, the rank designation unit 113 of the information processing device 1 generates a directed edge toward an attribute with a larger occurrence set from an attribute with a smaller occurrence set (S12).

Subsequently, the rank designation unit 113 generates a directed acyclic graph from each of the directed edges generated in the process in S12 (S13). Thereafter, the information management unit 111 of the information processing device 1 generates the graph information 131, which is information indicating the directed acyclic graph generated by the rank designation unit 113, and stores the generated graph information 131 in the information storage area 130, for example. Hereinafter, specific examples of the processes in S12 and S13 will be described.

[Specific Examples of Processes in S12 and S13]

Figure 15A:
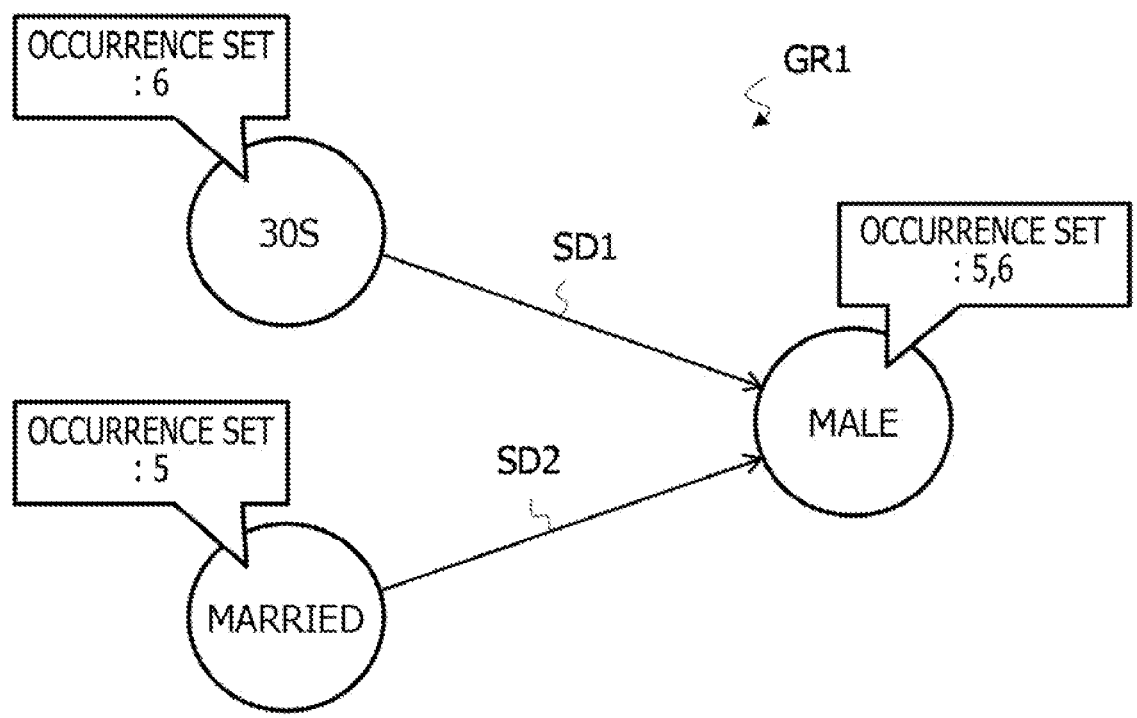
FIG. 15A and FIG. 15B are diagrams explaining specific examples of processes in S12 and S13.
Figure 15B:

FIG. 15A and FIG. 15B are diagrams explaining specific examples of the processes in S12 and S13.

In the table described with reference to FIG. 14, the attributes included in each of the attribute patterns set in the "attribute pattern" are "male", "30s", and "married". Then, in the table described with reference to FIG. 14, "5" and "6" are set in the "occurrence set (DN)" for samples (samples in the second row) whose "attribute pattern" is "male", "6" is set in the "occurrence set (DN)" for samples (samples in the third row) whose "attribute pattern" is "30s", and "5" is set in the "occurrence set (DN)" for samples (samples in the fourth row) whose "attribute pattern" is "married".

For example, the table described with reference to FIG. 14 indicates that "6", which forms the occurrence set of negative examples corresponding to "30s", is included in "5" and "6", which form the occurrence set of negative examples corresponding to "male". In addition, the table described with reference to FIG. 14 indicates that "5", which forms the occurrence set of negative examples corresponding to "married", is included in "5" and "6", which form the occurrence set of negative examples corresponding to "male".

Therefore, the rank designation unit 113 generates a directed edge SD1 whose output source is a vertex corresponding to "30s" and whose output destination is a vertex corresponding to "male" in the process in S12. In addition, the rank designation unit 113 generates a directed edge SD2 whose output source is a vertex corresponding to "married" and whose output destination is a vertex corresponding to "male" in the process in S12.

Then, in the process in S13, the rank designation unit 113 generates a directed acyclic graph GR1 by linking "male", "30s", and "married", which are each the attribute, with each other using the generated directed edge SD1 and directed edge SD2, as illustrated in FIG. 15A.

Returning to FIG. 4, the rank designation unit 113 refers to the directed acyclic graph (the graph information 131 stored in the information storage area 130) generated in the process in S13 to designate the priority ranks of each attribute included in the plurality of attribute patterns such that the attribute at the output source is ranked higher than the attribute at the output destination in each of the directed edges (S14). Then, the information management unit 111 stores the rank information 132 indicating the priority ranks designated in the process in S14, in the information storage area 130, for example.

Specifically, as illustrated in FIG. 15B, for example, by ranking such that each of the vertices at the output sources is put before the vertex at the output destination, the rank designation unit 113 designates the ranks of each attribute in the order of "30s", "married", and "male".

[Rank Designation Process (2)]

Figure 5:
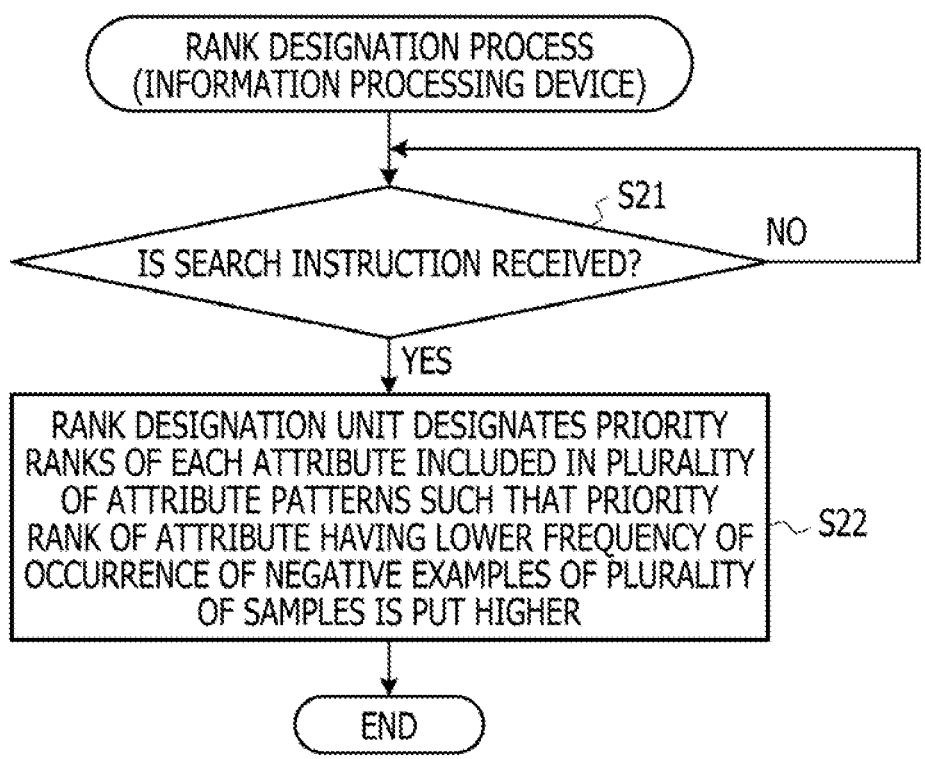
FIG. 5 is a flowchart diagram explaining the pattern search process according to the first embodiment.

Next, a rank designation process (hereinafter, also referred to as another rank designation process) having contents different from those of the rank designation process described with reference to FIG. 4 will be described. FIG. 5 is a flowchart diagram explaining the another rank designation process.

As illustrated in FIG. 5, the information reception unit 112 waits until receiving a search instruction input via the operation terminal 2, for example (NO in S21).

Then, when the search instruction is received (YES in S21), the rank designation unit 113 designates the priority ranks of each attribute included in the plurality of attribute patterns such that the priority rank of an attribute having a lower frequency of occurrence of negative examples of the plurality of samples is put higher (S22). Then, the information management unit 111 stores the rank information 132 indicating the priority ranks designated in the process in S22, in the information storage area 130, for example.

This means that, for example, among attributes included in a plurality of attribute patterns, when the occurrence set of negative examples of a certain attribute includes the occurrence set of negative examples of another attribute, it may be deduced that the frequency of occurrence of the certain attribute is higher than the frequency of occurrence of the another attribute. For this reason, the rank designation unit 113 may designate the attribute ranks of each attribute also based on the magnitude relationship of the frequency of occurrence between the respective attributes. Hereinafter, a specific example of the process in S22 will be described.

[Specific Example of Process in S22]

In the table described with reference to FIG. 14, the attributes included in each of the attribute patterns set in the "attribute pattern" are "male", "30s", and "married". Then, in the table described with reference to FIG. 14, "2" is set in the "frequency of occurrence (DN)" for samples (samples in the second row) whose "attribute pattern" is "male", "1" is set in the "frequency of occurrence (DN)" for samples (samples in the third row) whose "attribute pattern" is "30s", and "1" is set in the "frequency of occurrence (DN)" for data (data in the fourth row) whose "attribute pattern" is "married".

For example, the table described with reference to FIG. 14 indicates that "1", which is the frequency of occurrence of negative examples corresponding to "30s", is smaller than "2", which is the frequency of occurrence of negative examples corresponding to "male". In addition, the table described with reference to FIG. 14 indicates that "1", which is the frequency of occurrence of negative examples corresponding to "married", is smaller than "2", which is the frequency of occurrence of negative examples corresponding to "male".

Therefore, in the process in S22, the rank designation unit 113 determines the ranks of each attribute in the order of "30s", "married", and "male", for example.

[Pattern Determination Process (1)]

Figure 6:
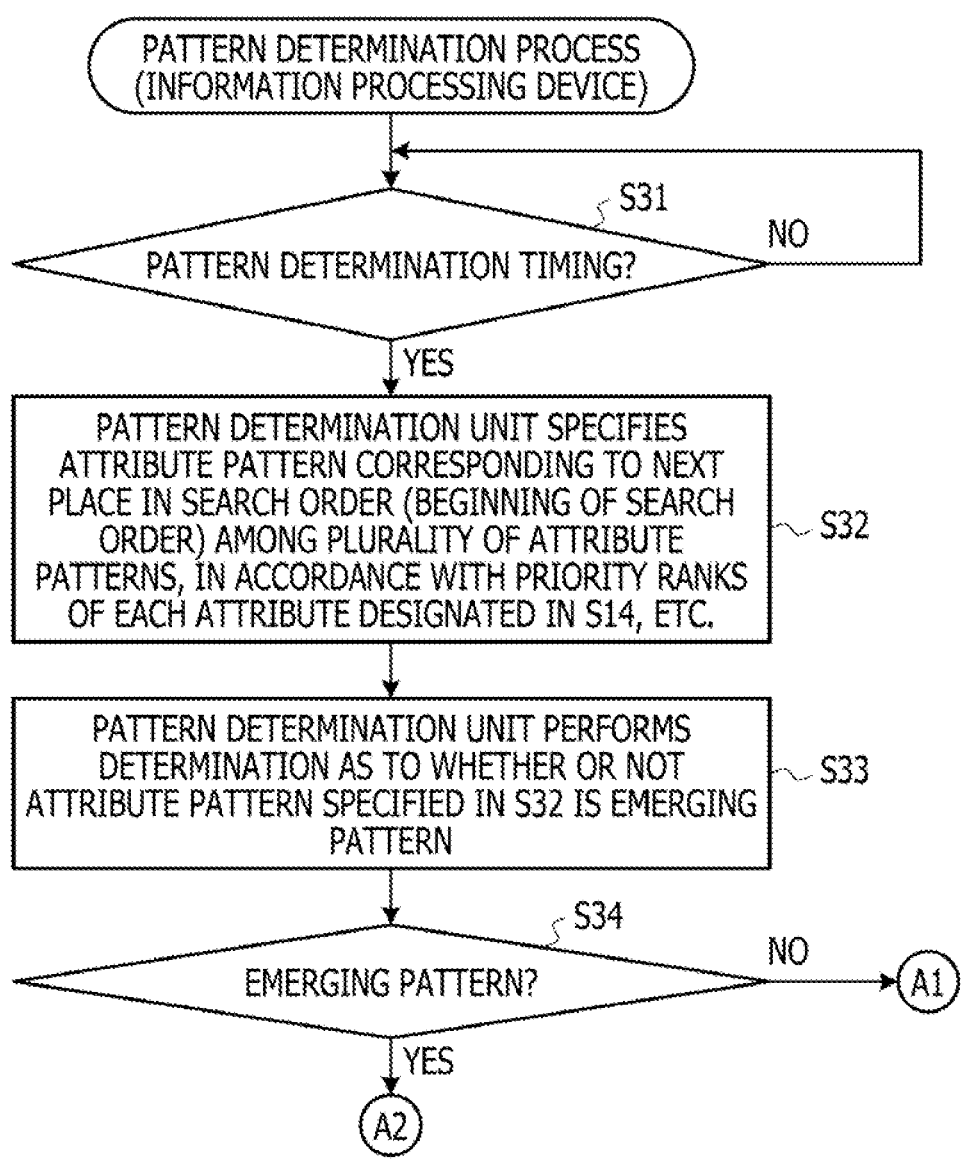
FIG. 6 is a flowchart diagram explaining the pattern search process according to the first embodiment.
Figure 7:
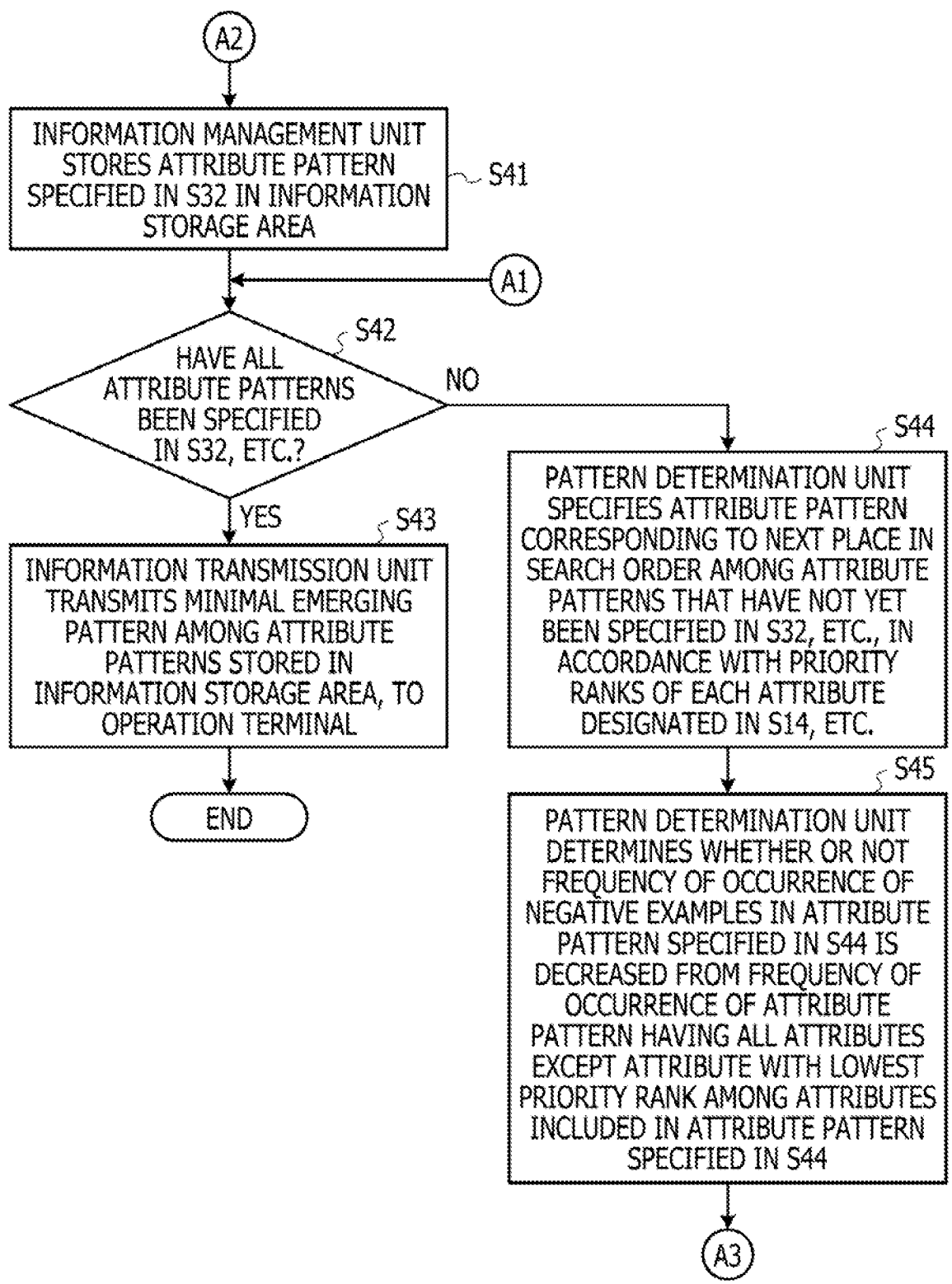
FIG. 7 is a flowchart diagram explaining the pattern search process according to the first embodiment.
Figure 8:
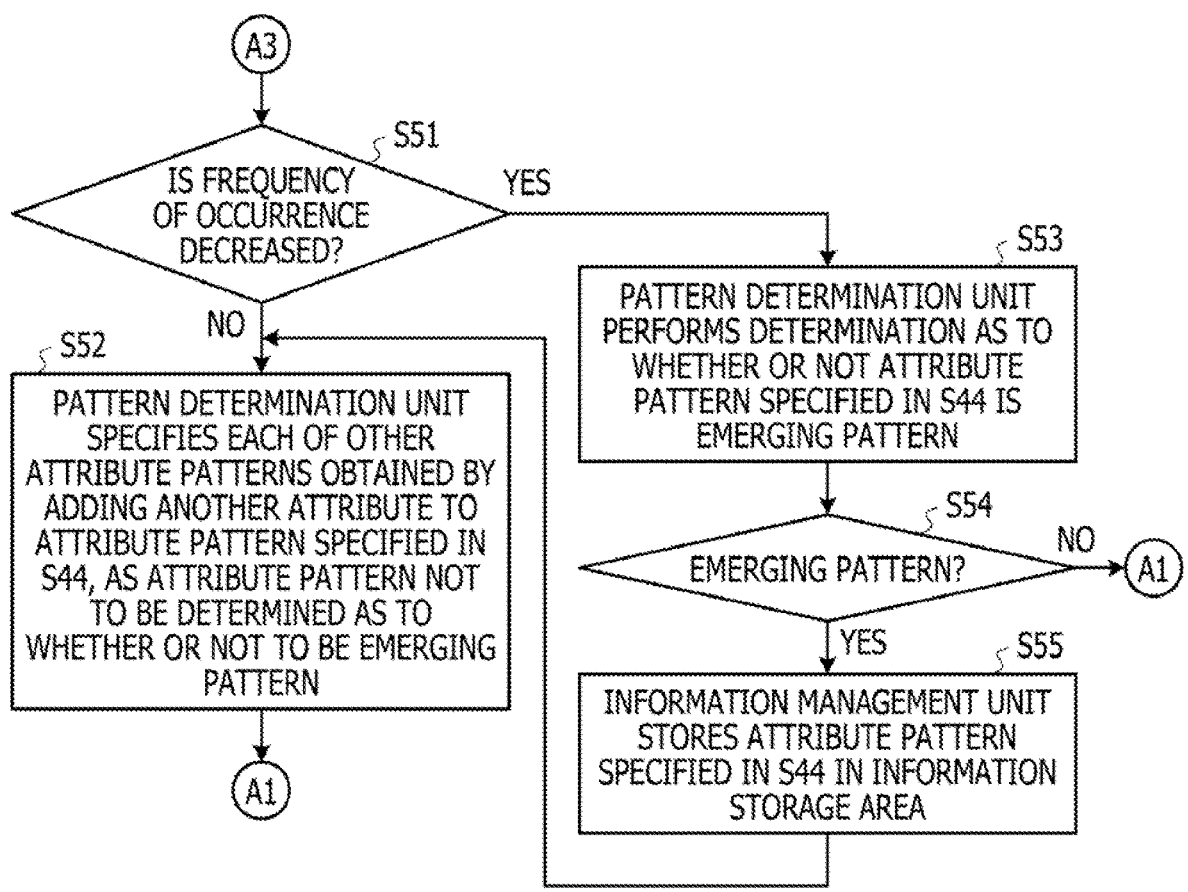
FIG. 8 is a flowchart diagram explaining the pattern search process according to the first embodiment.

Next, as a part of the pattern search process, a process of determining whether or not a plurality of attribute patterns is an emerging pattern (hereinafter, also referred to as a pattern determination process) will be described. FIGS. 6 to 8 are flowchart diagrams explaining the pattern determination process.

As illustrated in FIG. 6, the pattern determination unit 114 of the information processing device 1 waits until a pattern determination timing is reached, for example (NO in S31). The pattern determination timing may be, for example, the timing after the rank designation process is completed. In addition, the pattern determination timing may be, for example, the timing at which an instruction to start the pattern determination process is input via the operation terminal 2.

Then, when the pattern determination timing is reached (YES in S31), the pattern determination unit 114 specifies an attribute pattern corresponding to the beginning of the search order among the plurality of attribute patterns, in accordance with the priority ranks of each attribute designated in the process in S14 or the process in S22 (S32).

Specifically, for example, when the search order of the plurality of attribute patterns is designated such that the attributes included in each attribute pattern are placed in a lexicographic order in accordance with the priority ranks designated in the process in S14 or the like, the pattern determination unit 114 specifies an attribute pattern associated with the beginning of the search order.

Note that, when an attribute pattern that includes no attribute is included in the plurality of attribute patterns, the pattern determination unit 114 specifies the attribute pattern that includes no attribute as an attribute pattern associated with the beginning of the search order.

Specifically, in the table described with reference to FIG. 14, the data that is set in the "attribute pattern" includes "none", "male", "30s", "married", "male, 30s", "male, married", "30s, married", and "male, 30s, married". Therefore, the pattern determination unit 114 designates "none" as the attribute pattern corresponding to the beginning of the search order in the process in S32.

Subsequently, the pattern determination unit 114 performs a determination as to whether or not the attribute pattern specified in the process in S32 is an emerging pattern (S33).

As a result, when it is determined that the attribute pattern specified in the process in S32 is an emerging pattern (YES in S34), the information management unit 111 stores the pattern information 133 indicating the attribute pattern specified in the process in S32 in the information storage area 130, as illustrated in FIG. 7 (S41).

Thereafter, the pattern determination unit 114 determines whether or not all the attribute patterns have been specified in the process in S32, the process in S44, or the process in S52 (S42). The pattern determination unit 114 similarly performs the process in S42 also when it is determined in the process in S34 that the attribute pattern specified in the process in S32 is not an emerging pattern (NO in S34).

As a result, when it is determined that all the attribute patterns have not been specified in the process in S32, the process in S44, or the process in S52 (NO in S42), the pattern determination unit 114 specifies an attribute pattern corresponding to the next place in the search order among attribute patterns that have not yet been specified in the process in S32, the process in S44, or the process in S52, in accordance with the priority ranks of each attribute designated in the process in S14 or the process in S22 (S44).

Specifically, in the table described with reference to FIG. 14, the data that is set in the "attribute pattern" includes "none", "male", "30s", "married", "male, 30s", "male, married", "30s, married", and "male, 30s, married". Therefore, when the ranks of each attribute designated in the process in S14 or the like is in the order of "30s", "married", and "male", the pattern determination unit 114 designates "30s" as the attribute pattern corresponding to the next place in the search order in the process in S44 at the first time.

Then, the pattern determination unit 114 determines whether or not the frequency of occurrence of negative examples in the attribute pattern specified in the process in S44 is decreased from the frequency of occurrence of an attribute pattern having all the attributes except an attribute with the lowest priority rank among the attributes included in the attribute pattern specified in the process in S44 (S45).

Specifically, when the attribute pattern specified in the process in S44 is "30s", the attribute pattern having all the attributes except the attribute with the lowest priority rank among the attributes included in the attribute pattern specified in the process in S44 is "none". Therefore, in this case, the pattern determination unit 114 performs a determination as to whether or not the frequency of occurrence of negative examples corresponding to "30s" is decreased from the frequency of occurrence of negative examples corresponding to "none".

As a result, as illustrated in FIG. 8, when it is determined that the frequency of occurrence of negative examples in the attribute pattern specified in the process in S44 is not decreased from the frequency of occurrence of the attribute pattern having all the attributes except the attribute with the lowest priority rank among the attributes included in the attribute pattern specified in the process in S44 (NO in S51), the pattern determination unit 114 specifies each of other attribute patterns obtained by adding another attribute to the attribute pattern specified in the process in S44, as an attribute pattern for which the process in S53 is not to be performed (S52).

For example, when it is determined that the frequency of occurrence of negative examples in the attribute pattern specified in the process in S44 is not decreased from the frequency of occurrence of the attribute pattern having all the attributes except the attribute with the lowest priority rank among the attributes included in the attribute pattern specified in the process in S44, the information processing device 1 may determine that other attribute patterns obtained by adding another attribute to the attribute pattern specified in the process in S44 does not include the minimal emerging pattern. Therefore, for example, when it is detected that the frequency of occurrence is not decreased as described above, the information processing device 1 chooses to omit making a determination for the attribute pattern specified in the process in S44 and making a determination for other attribute patterns obtained by adding another attribute to the attribute pattern specified in the process in S44.

This allows the information processing device 1 to reduce the calculation processing cost involved in extracting the minimal emerging pattern.

On the other hand, when it is determined that the frequency of occurrence of the attribute pattern specified in the process in S44 is decreased from the frequency of occurrence of the attribute pattern having all the attributes except the attribute with the lowest priority rank among the attributes included in the attribute pattern specified in the process in S44 (YES in S51), the pattern determination unit 114 performs a determination as to whether or not the attribute pattern specified in the process in S44 is an emerging pattern (S53).

Then, when it is determined that the attribute pattern specified in the process in S44 is an emerging pattern (YES in S54), the information management unit 111 stores the pattern information 133 indicating the attribute pattern specified in the process in S44 in the information storage area 130 (S55). Thereafter, the pattern determination unit 114 performs the processes in S52 and the subsequent steps.

For example, when the attribute pattern specified in the process in S44 is an emerging pattern, it may be deduced that other attribute patterns obtained by adding another attribute to the attribute pattern specified in the process in S44 does not form a minimal emerging pattern. Therefore, when it is determined that the attribute pattern specified in the process in S44 is an emerging pattern, the pattern determination unit 114 omits to make a determination for other attribute patterns obtained by adding another attribute to the attribute pattern specified in the process in S44.

Then, after the process in S52 or when it is determined that the attribute pattern specified in the process in S44 is not an emerging pattern (NO in S54), the pattern determination unit 114 performs the processes in S42 and the subsequent steps.

Thereafter, when it is determined in the process in S42 that all the attribute patterns have been specified in the process in S33, the process in S44, or in the process in S52 (YES in S42), the information transmission unit 115 of the information processing device 1 transmits information indicating the minimal emerging pattern, which is a part of the pattern information 133 stored in the information storage area 130, to the operation terminal 2, for example (S43).

Specifically, in this case, the pattern determination unit 114 specifies the minimal emerging pattern from among the attribute patterns indicated by the pattern information 133 stored in the information storage area 130. Then, the information transmission unit 115 transmits information indicating the minimal emerging pattern specified by the pattern determination unit 114. Hereinafter, specific examples of the pattern determination process described with reference to FIGS. 6 to 8 will be described.

[Specific Example (1) of Pattern Determination Process]

Figure 16:
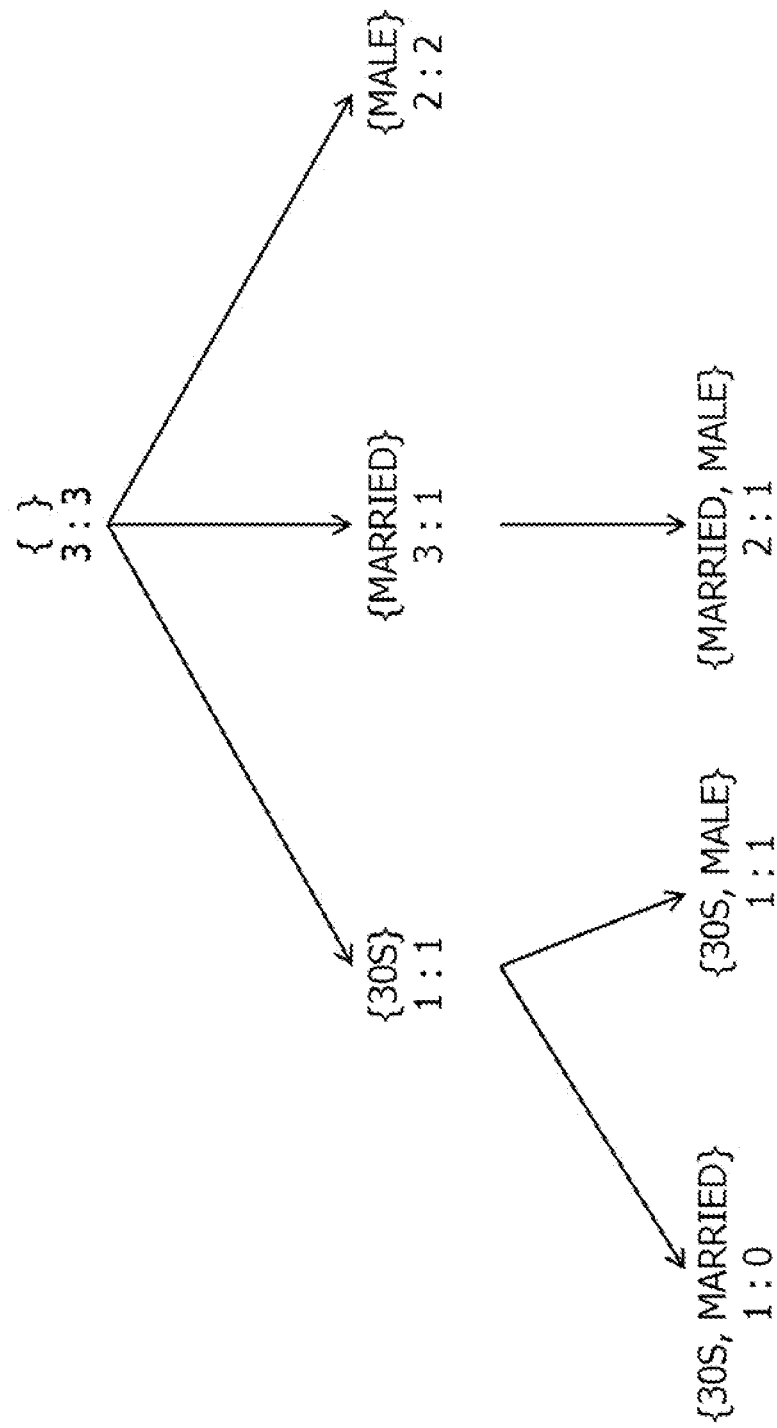
FIG. 16 is a diagram explaining a specific example of a pattern determination process described with reference to FIGS. 6 to 8.
Figure 17:
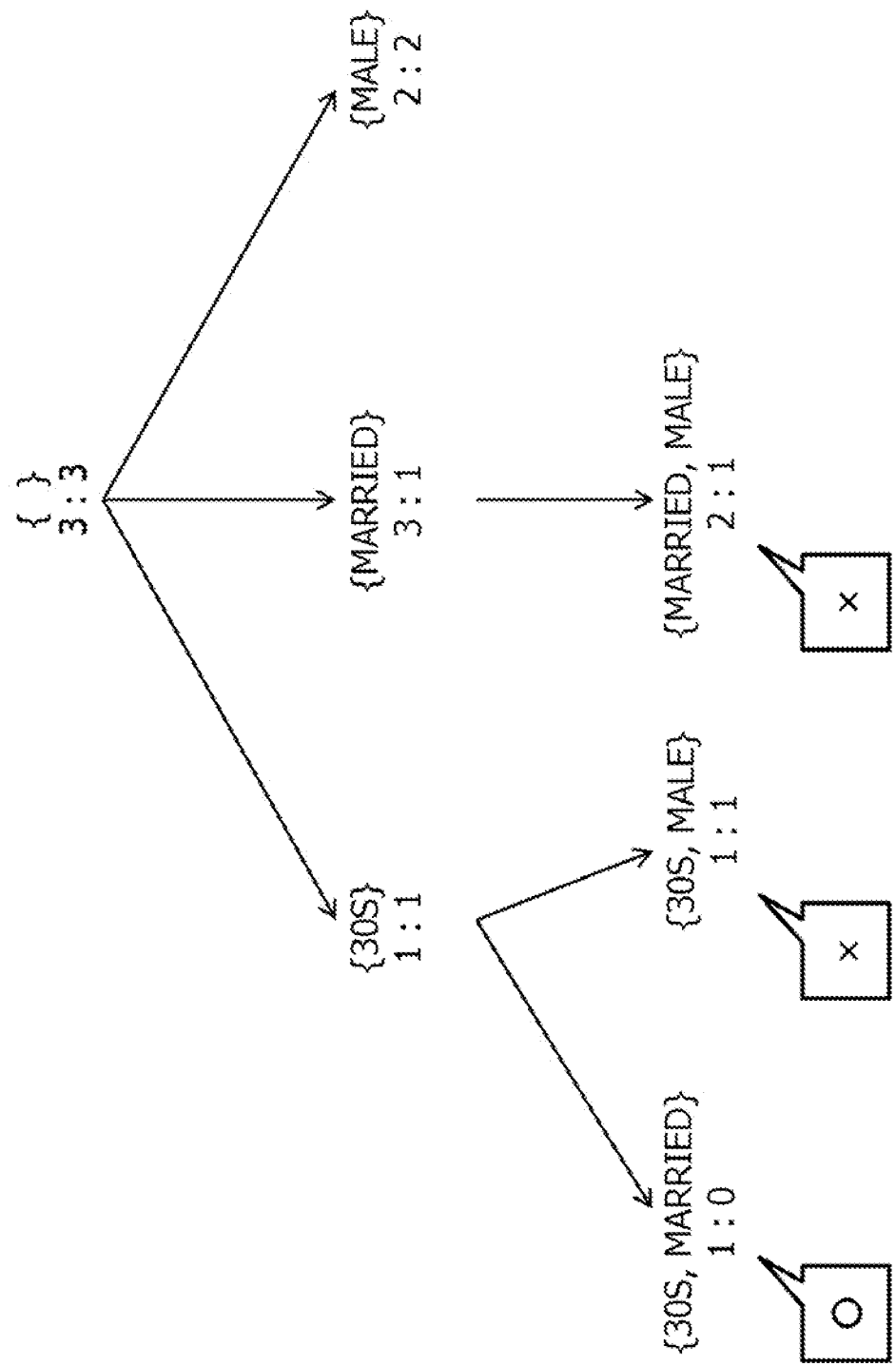
FIG. 17 is a diagram explaining a specific example of the pattern determination process described with reference to FIGS. 6 to 8.

FIGS. 16 and 17 are diagrams explaining specific examples of the pattern determination process described with reference to FIGS. 6 to 8.

The examples illustrated in FIGS. 16 and 17 depict a tree structure in which each attribute pattern is associated with nodes on a one-to-one basis. Then, in the examples illustrated in FIGS. 16 and 17, the number on the left side associated with each node indicates the frequency of occurrence of positive examples in the attribute pattern corresponding to each node as a part of the data described with reference to FIG. 14, whereas the number on the right side associated with each node indicates the frequency of occurrence of negative examples in the attribute pattern corresponding to each node as a part of the data described with reference to FIG. 14. Note that, hereinafter, when the frequency of occurrence of positive examples in each attribute pattern is equal to or greater than one and the frequency of occurrence of negative examples in each attribute pattern is zero, description will be given by assuming that each attribute pattern is determined to be an emerging pattern.

(Search for Attribute Pattern that Includes No Attribute)

First, in the process in S32, the pattern determination unit 114 specifies "none", which is an attribute pattern corresponding to the first place in the search order among the attribute patterns included in the table described with reference to FIG. 14. Then, as illustrated in FIG. 16, the pattern determination unit 114 associates the specified "none" with the root node, for example.

Here, in the example illustrated in FIG. 16, the frequency of occurrence of positive examples and the frequency of occurrence of negative examples corresponding to "none", which is an attribute pattern, are both "3". Therefore, the pattern determination unit 114 determines that "none" is not an emerging pattern in the process in S33.

(Search for Attribute Pattern that Includes "30s")

Next, in the process in S44, the pattern determination unit 114 specifies "30s", which is an attribute pattern corresponding to the second place in the search order among the attribute patterns included in the table described with reference to FIG. 14. In addition, as illustrated in FIG. 16, the pattern determination unit 114 associates the specified "30s" with the child node of the root node, for example.

Here, in the example illustrated in FIG. 16, "1", which is the frequency of occurrence of negative examples of the node corresponding to "30s", which is an attribute pattern, is decreased from "3", which is the frequency of occurrence of negative examples of the node corresponding to "none". Therefore, the pattern determination unit 114 performs a determination as to whether or not "30s" is an emerging pattern in the process in S53. Specifically, in the example illustrated in FIG. 16, the frequency of occurrence of positive examples and the frequency of occurrence of negative examples corresponding to "30s" are both "1". Therefore, the pattern determination unit 114 determines that "30s" is not an emerging pattern in the process in S53.

(Search for Attribute Pattern that Includes "30s" and "Married")

Next, in the process in S44, the pattern determination unit 114 specifies "30s, married", which is an attribute pattern corresponding to the third place in the search order among the attribute patterns included in the table described with reference to FIG. 14. In addition, as illustrated in FIG. 16, the pattern determination unit 114 associates the specified "30s, married" with the child node corresponding to the "30s", for example.

Here, in the example illustrated in FIG. 16, "0", which is the frequency of occurrence of negative examples of the node corresponding to "30s, married", is decreased from "1", which is the frequency of occurrence of negative examples of the node corresponding to "30s". Therefore, the pattern determination unit 114 performs a determination as to whether or not "30s, married" is an emerging pattern in the process in S53. Specifically, in the example illustrated in FIG. 16, the frequency of occurrence of positive examples and the frequency of occurrence of negative examples corresponding to "30s, married" are "1" and "0", respectively. Therefore, the pattern determination unit 114 determines that "30s, married" is an emerging pattern in the process in S53.

Accordingly, the pattern determination unit 114 chooses to omit the determination for attribute patterns obtained by adding a new attribute to "30s, married" in the process in S52. Specifically, in this case, the pattern determination unit 114 omits the determination for "30s, married, male", which is an attribute pattern corresponding to the fourth place in the search order.

(Search for Attribute Pattern that Includes "30s" and "Male")

Next, in the process in S44, the pattern determination unit 114 specifies "30s, male", which is an attribute pattern corresponding to the fifth place in the search order among the attribute patterns included in the table described with reference to FIG. 14. In addition, as illustrated in FIG. 16, the pattern determination unit 114 associates the specified "30s, male" with the second child node corresponding to the "30s", for example.

Here, in the example illustrated in FIG. 16, "1", which is the frequency of occurrence of negative examples of the node corresponding to "30s, male", is not decreased from "1", which is the frequency of occurrence of negative examples of the node corresponding to "30s". Therefore, the pattern determination unit 114 does not perform a determination as to whether or not "30s, male" is an emerging pattern in the process in S53.

(Search for Attribute Patterns that Includes "Married")

Next, in the process in S44, the pattern determination unit 114 specifies "married", which is an attribute pattern corresponding to the sixth place in the search order among the attribute patterns included in the table described with reference to FIG. 14. In addition, as illustrated in FIG. 16, the pattern determination unit 114 associates the specified "married" with the second child node of the root node, for example.

Here, in the example illustrated in FIG. 16, "1", which is the frequency of occurrence of negative examples of the node corresponding to "married", is decreased from "3", which is the frequency of occurrence of negative examples of the node corresponding to "none". Therefore, the pattern determination unit 114 performs a determination as to whether or not "married" is an emerging pattern in the process in S53. Specifically, in the example illustrated in FIG. 16, the frequency of occurrence of positive examples and the frequency of occurrence of negative examples corresponding to "married" are "3" and "1", respectively. Therefore, the pattern determination unit 114 determines that "married" is not an emerging pattern in the process in S53.

(Search for Attribute Pattern that Includes "Married" and "Male")

Next, in the process in S44, the pattern determination unit 114 specifies "married, male", which is an attribute pattern corresponding to the seventh place in the search order among the attribute patterns included in the table described with reference to FIG. 14. In addition, as illustrated in FIG. 16, the pattern determination unit 114 associates the specified "married, male" with the child node corresponding to the "married", for example.

Here, in the example illustrated in FIG. 16, "1", which is the frequency of occurrence of negative examples of the node corresponding to "married, male", is not decreased from "1", which is the frequency of occurrence of negative examples of the node corresponding to "married". Therefore, the pattern determination unit 114 does not perform a determination as to whether or not "married, male" is an emerging pattern in the process in S53.

(Search for Attribute Pattern that Includes "Male")

Next, in the process in S44, the pattern determination unit 114 specifies "male", which is an attribute pattern corresponding to the eighth place in the search order among the attribute patterns included in the table described with reference to FIG. 14. In addition, as illustrated in FIG. 16, the pattern determination unit 114 associates the specified "male" with the third child node of the root node, for example.

Here, in the example illustrated in FIG. 16, "2", which is the frequency of occurrence of negative examples of the node corresponding to "male", is decreased from "3", which is the frequency of occurrence of negative examples of the node corresponding to "none". Therefore, the pattern determination unit 114 performs a determination as to whether or not "male" is an emerging pattern in the process in S53. Specifically, in the example illustrated in FIG. 16, the frequency of occurrence of positive examples and the frequency of occurrence of negative examples corresponding to "male" are "2" and "2", respectively. Therefore, the pattern determination unit 114 determines that "male" is not an emerging pattern in the process in S53.

For example, as illustrated in FIG. 17, the pattern determination unit 114 omits to make a determination for other attribute patterns obtained by adding another attribute to the attribute pattern (the attribute pattern corresponding to white circle), which is an emerging pattern. In addition, as illustrated in FIG. 17, the pattern determination unit 114 omits to make a determination for the attribute patterns (the attribute patterns corresponding to "x") that may be deduced to have no possibility of being the minimal emerging pattern.

This allows the pattern determination unit 114 to extract an emerging pattern having a possibility of being the minimal emerging pattern, while suppressing the number of times the determination as to whether or not each attribute pattern is an emerging pattern is performed.

[Pattern Determination Process (2)]

Next, a pattern determination process (hereinafter, also referred to as another pattern determination process) having contents different from the pattern determination process described with reference to FIGS. 6 to 8 will be described. FIGS. 9 to 12 are flowchart diagrams explaining the another pattern determination process.

Figure 9:
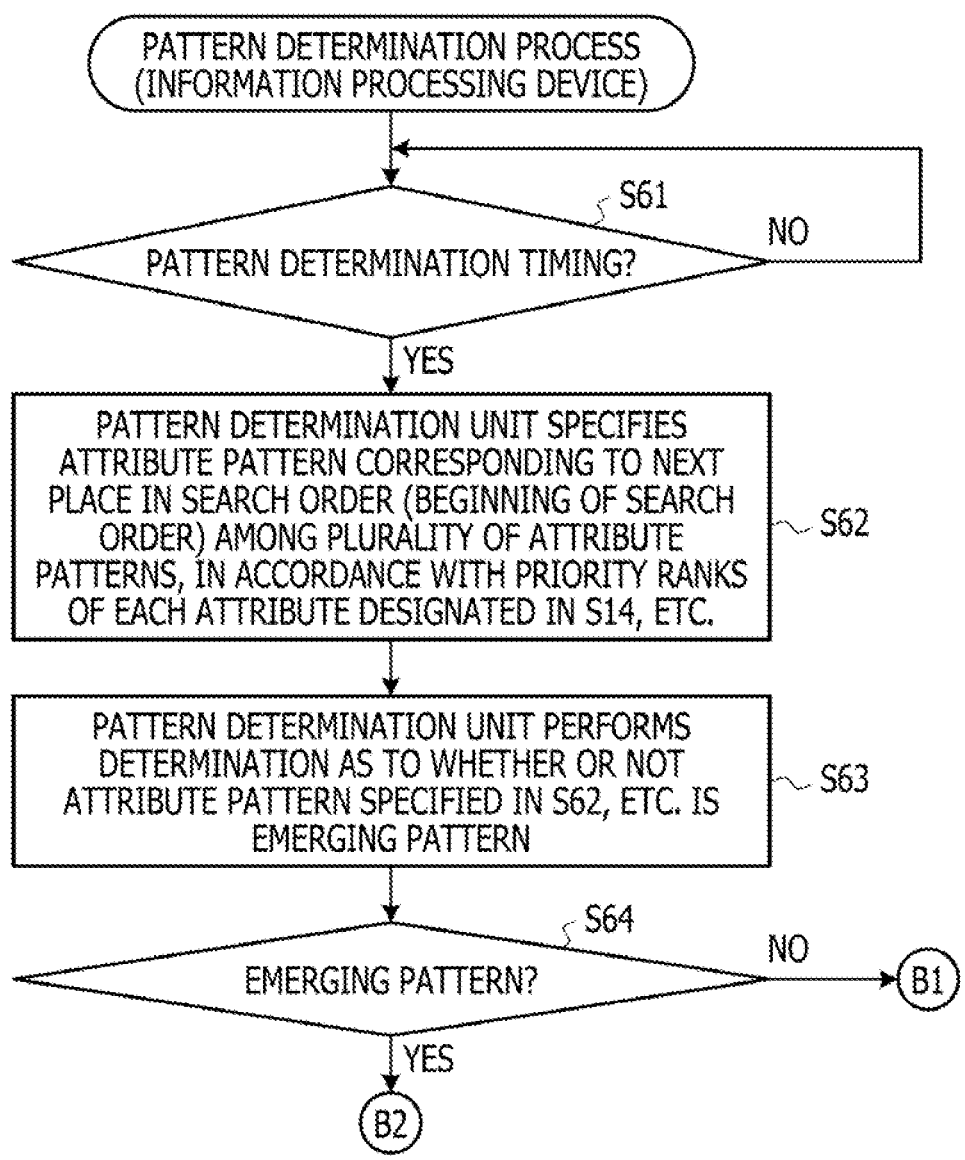
FIG. 9 is a flowchart diagram explaining the pattern search process according to the first embodiment.

As illustrated in FIG. 9, the pattern determination unit 114 waits until a pattern determination timing is reached, for example (NO in S61).

Then, when the pattern determination timing is reached (YES in S61), the pattern determination unit 114 specifies an attribute pattern corresponding to the beginning of the search order among the plurality of attribute patterns, in accordance with the priority ranks of each attribute designated in the process in S14 or the process in S22 (S62).

Specifically, for example, when the search order of the plurality of attribute patterns is designated such that the attributes included in each attribute pattern are placed in a lexicographic order in accordance with the priority ranks designated in the process in S14 or the like, the pattern determination unit 114 specifies an attribute pattern associated with the beginning of the search order.

Subsequently, the pattern determination unit 114 performs a determination as to whether or not the attribute pattern specified in the process in S62 is an emerging pattern (S63).

Figure 10:
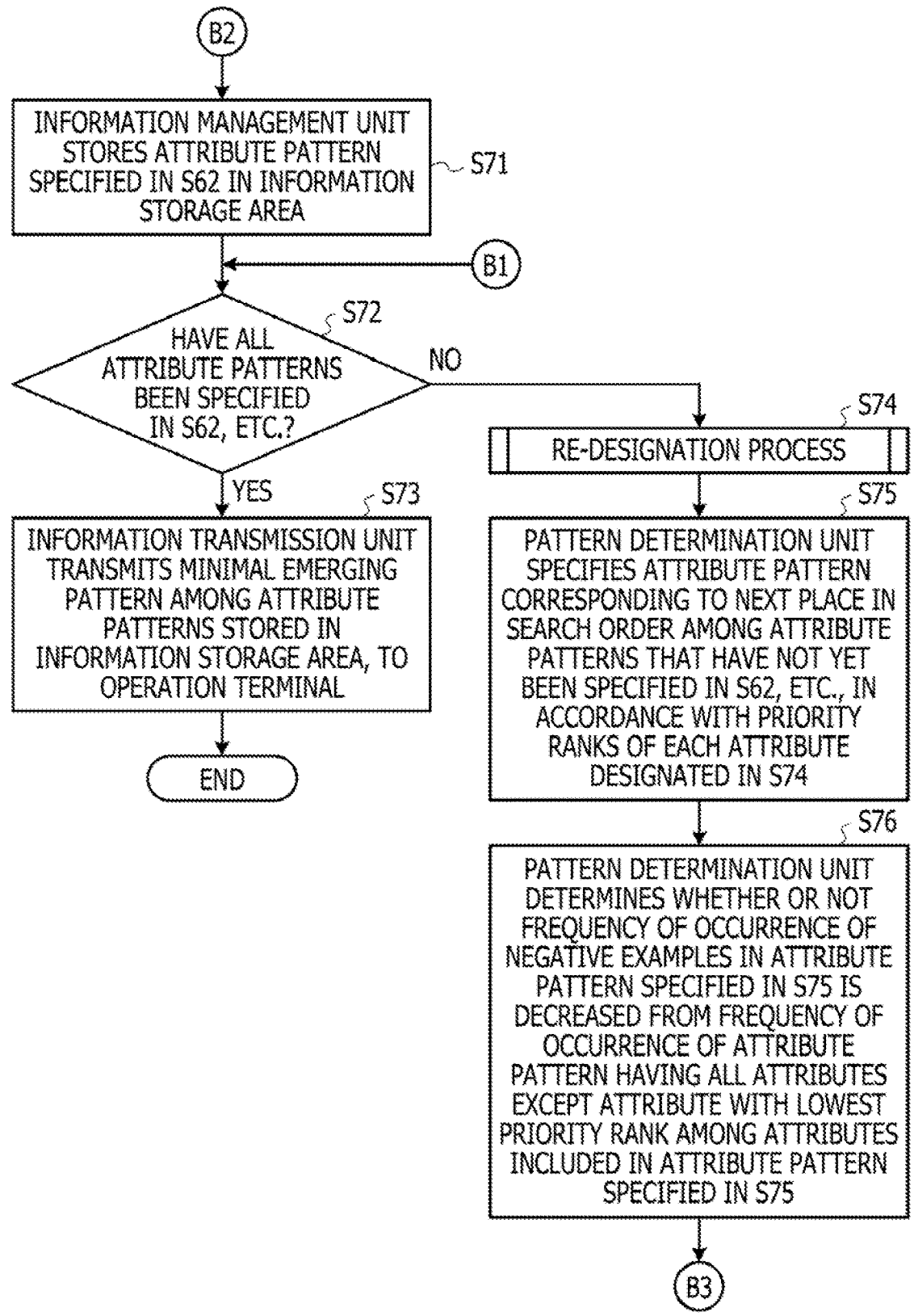
FIG. 10 is a flowchart diagram explaining the pattern search process according to the first embodiment.

As a result, when it is determined that the attribute pattern specified in the process in S62 is an emerging pattern (YES in S64), the information management unit 111 stores the pattern information 133 indicating the attribute pattern specified in the process in S62 in the information storage area 130, as illustrated in FIG. 10 (S71).

Thereafter, the pattern determination unit 114 determines whether or not all the attribute patterns have been specified in the process in S62, the process in S75, or the process in S82 (S72). The pattern determination unit 114 similarly performs the process in S72 also when it is determined in the process in S64 that the attribute pattern specified in the process in S62 is not an emerging pattern (NO in S64).

As a result, when it is determined that all the attribute patterns have not been specified in the process in S62, the process in S75, or the process in S82 (NO in S72), the pattern determination unit 114 performs a process of re-designating the priority ranks of each attribute included in the plurality of attribute patterns (hereinafter, also referred to as a re-designation process) (S74).

For example, in the another pattern determination process illustrated in FIGS. 9 to 12, the priority ranks of each attribute is re-designated each time a determination as to whether or not each attribute pattern is an emerging pattern is performed.

This allows the information processing device 1 to create a large number of situations in which it is feasible to omit making a determination as to whether or not each attribute pattern is an emerging pattern. Hereinafter, the re-designation process will be described.

[Re-Designation Process]

Figure 12:
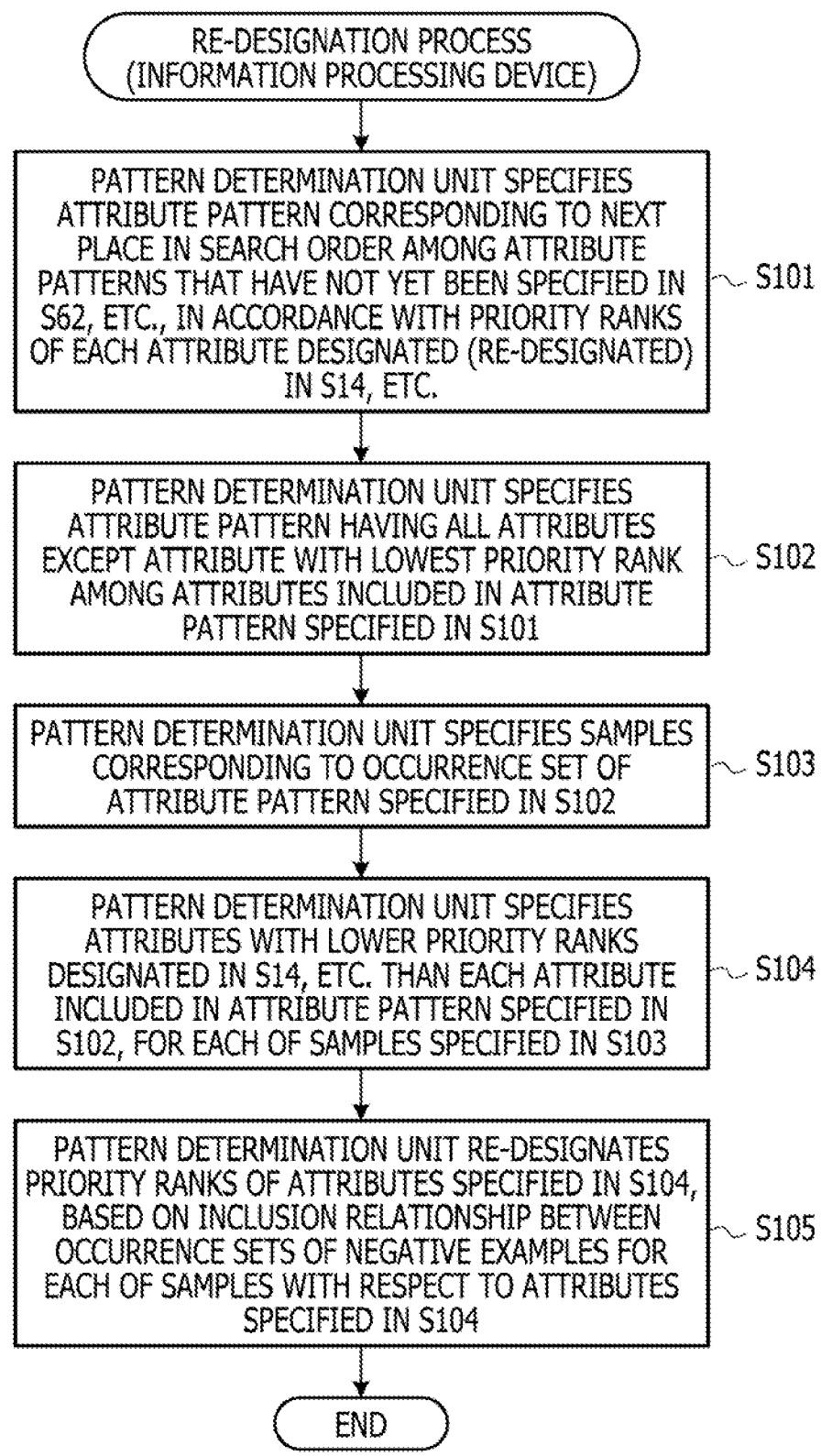
FIG. 12 is a flowchart diagram explaining the pattern search process according to the first embodiment.

FIG. 12 is a flowchart diagram explaining the re-designation process.

The pattern determination unit 114 specifies an attribute pattern corresponding to the next place in the search order among attribute patterns that have not yet been specified in the process in S62, the process in S75, or the process in S82, in accordance with the priority ranks of each attribute that have already been designated (re-designated) in the process in S14, the process in S22, or the process in of S74 (S101).

Then, the pattern determination unit 114 specifies an attribute pattern having all the attributes except the attribute with the lowest priority rank among the attributes included in the attribute pattern specified in the process in S101 (S102).

Subsequently, the pattern determination unit 114 specifies one or more samples corresponding to the occurrence set of the attribute pattern specified in the process in S102 (S103).

Specifically, the pattern determination unit 114 specifies one or more samples including the occurrence set of the attribute pattern specified in the process in S102, among the plurality of samples included in the data set DN, for example.

Then, the pattern determination unit 114 specifies one or more attributes with lower priority ranks that have already been designated in the process in S14, the process in S22, or the process in S74 than each attribute included in the attribute pattern specified in the process in S102, for each of the one or more samples specified in the process in S103 (S104).

Thereafter, the pattern determination unit 114 re-designates the priority ranks of the one or more attributes specified in the process in S104, based on the inclusion relationship between the occurrence sets of negative examples of the one or more samples specified in the process in S103 with respect to the one or more attributes specified in the process in S104 (S105).

Note that, when the processes in S103 and the subsequent steps have already been performed for the attribute pattern specified in the process in S102, the pattern determination unit 114 may omit the execution of the processes in S103 and the subsequent steps.

Returning to FIG. 10, the pattern determination unit 114 specifies an attribute pattern corresponding to the next place in the search order among attribute patterns that have not yet been specified in the process in S62, the process in S75, or the process in S82, in accordance with the priority ranks of each attribute designated in the process in S74 (S75).

Then, the pattern determination unit 114 determines whether or not the frequency of occurrence of negative examples in the attribute pattern specified in the process in S75 is decreased from the frequency of occurrence of an attribute pattern having all the attributes except an attribute with the lowest priority rank among the attributes included in the attribute pattern specified in the process in S75 (S76).

Figure 11:
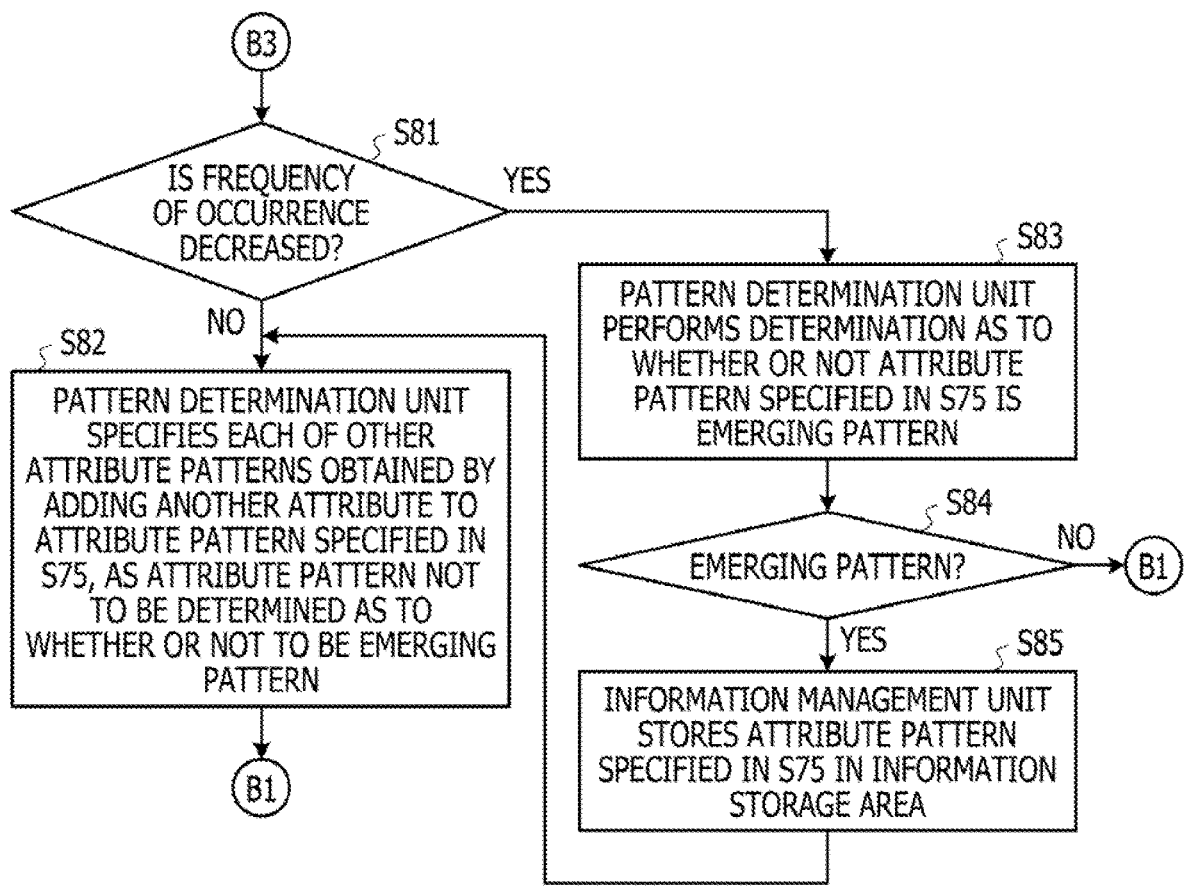
FIG. 11 is a flowchart diagram explaining the pattern search process according to the first embodiment.

As a result, as illustrated in FIG. 11, when it is determined that the frequency of occurrence of negative examples in the attribute pattern specified in the process in S75 is not decreased from the frequency of occurrence of the attribute pattern having all the attributes except the attribute with the lowest priority rank among the attributes included in the attribute pattern specified in the process in S75 (NO in S81), the pattern determination unit 114 specifies each of other attribute patterns obtained by adding another attribute to the attribute pattern specified in the process in S74, as an attribute pattern for which the process in S83 is not to be performed, from among attribute patterns that have not yet been specified in the process in S62, the process in S75, or the process in S82 (S82).

For example, when it is determined that the frequency of occurrence of the attribute pattern specified in the process in S75 is not decreased from the frequency of occurrence of the attribute pattern having all the attributes except the attribute with the lowest priority rank among the attributes included in the attribute pattern specified in the process in S75, the information processing device 1 determines that other attribute patterns obtained by adding another attribute to the attribute pattern specified in the process in S75 does not include the minimal emerging pattern. Therefore, for example, when it is detected that the frequency of occurrence is not decreased as described above, the information processing device 1 chooses to omit making a determination for the attribute pattern specified in the process in S75 and making a determination for other attribute patterns obtained by adding another attribute to the attribute pattern specified in the process in S75.

Furthermore, the information processing device 1 has designated the priority ranks of each attribute included in the plurality of attribute patterns in advance in order to create a large number of situations in which it is feasible to omit making a determination as described above in the rank designation process described with reference to FIGS. 4 and 5.

This allows the information processing device 1 to reduce the calculation processing cost involved in extracting the minimal emerging pattern.

On the other hand, when it is determined that the frequency of occurrence of the attribute pattern specified in the process in S75 is decreased from the frequency of occurrence of the attribute pattern having all the attributes except the attribute with the lowest priority rank among the attributes included in the attribute pattern specified in the process in S75 (YES in S81), the pattern determination unit 114 performs a determination as to whether or not the attribute pattern specified in the process in S75 is an emerging pattern (S83).

Then, when it is determined that the attribute pattern specified in the process in S75 is an emerging pattern (YES in S84), the information management unit 111 stores the pattern information 133 indicating the attribute pattern specified in the process in S75 in the information storage area 130 (S85). Thereafter, the pattern determination unit 114 performs the processes in S82 and the subsequent steps.

For example, when the attribute pattern specified in the process in S75 is an emerging pattern, it may be deduced that other attribute patterns obtained by adding another attribute to the attribute pattern specified in the process in S75 does not form a minimal emerging pattern. Therefore, when it is determined that the attribute pattern specified in the process in S75 is an emerging pattern, the pattern determination unit 114 omits to make a determination for other attribute patterns obtained by adding another attribute to the attribute pattern specified in the process in S75.

Then, after the process in S82 or when it is determined that the attribute pattern specified in the process in S75 is not an emerging pattern (NO in S84), the pattern determination unit 114 performs the processes in S72 and the subsequent steps.

As a result, when it is determined in the process in S72 that all the attribute patterns have been specified in the process in S63, the process in S75, or in the process in S82 (YES in S72), the information transmission unit 115 transmits information indicating the minimal emerging pattern, which is a part of the pattern information 133 stored in the information storage area 130, to the operation terminal 2 (S73).

Specifically, in this case, the pattern determination unit 114 specifies the minimal emerging pattern from among the attribute patterns indicated by the pattern information 133 stored in the information storage area 130, for example. Then, the information transmission unit 115 transmits information indicating the minimal emerging pattern specified by the pattern determination unit 114. Hereinafter, specific examples of the another pattern determination process described with reference to FIGS. 9 to 12 will be described.

[Specific Example (2) of Pattern Determination Process]

FIGS. 18 to 24 are diagrams explaining specific examples of the another pattern determination process described with reference to FIGS. 9 to 12.

The examples illustrated in FIGS. 19, 21, 22, and 24 depict a tree structure in which each attribute pattern is associated with nodes on a one-to-one basis. Then, in the examples illustrated in FIG. 19 and other drawings, the number on the left side associated with each node indicates the frequency of occurrence of positive examples in the attribute pattern corresponding to each node, whereas the number on the right side associated with each node indicates the frequency of occurrence of negative examples in the attribute pattern corresponding to each node. Note that, hereinafter, when the frequency of occurrence of positive examples in each attribute pattern is equal to or greater than one and the frequency of occurrence of negative examples in each attribute pattern is zero, description will be given by assuming that each attribute pattern is determined to be an emerging pattern.

[Specific Example of Data Set]

First, a specific example of the data set D used for explaining the another pattern determination process described with reference to FIGS. 9 to 12 will be described. FIG. 18A and FIG. 18B are diagrams explaining a specific example of the data set D. Specifically, FIG. 18A is a diagram explaining a specific example of the data set DP including samples of positive examples. In addition, FIG. 18B is a diagram explaining a specific example of the data set DP including samples of negative examples.

The data set D illustrated in FIG. 18A and FIG. 18B have the same items as the data set D described with reference to FIG. 13A and FIG. 13B.

Specifically, in the data set DP illustrated in FIG. 18A, "c" and "e" are set in the "attribute" of a sample whose "ID" is "1", and "b", "c", and "e" are set in the "attribute" of a sample whose "ID" is "2". In addition, "a", "b", and "d" are set in the "attribute" of a sample whose "ID" is "3", and "a", "b", and "d" are set in the "attribute" of a sample whose "ID" is "4".

Meanwhile, in the data set DN illustrated in FIG. 18B, "d" is set in the "attribute" of a sample whose "ID" is "5", and "c" and "d" are set in the "attribute" of a sample whose "ID" is "6". In addition, in the data set DN illustrated in FIG. 18B, "a", "b", and "c" are set in the "attribute" of a sample whose "ID" is "7", and "a", "b", "c", and "d" are set in the "attribute" of a sample whose "ID" is "8".

[Specific Example of Another Pattern Determination Process]

Next, specific examples of the another pattern determination process described with reference to FIGS. 9 to 12 will be described.

(Search for Attribute Pattern that Includes No Attribute)

First, the pattern determination unit 114 specifies "none", which is the attribute pattern corresponding to the beginning of the search order, in the process in S62. In addition, as illustrated in FIG. 19, the pattern determination unit 114 associates the specified "none" with the root node, for example.

Figure 19:
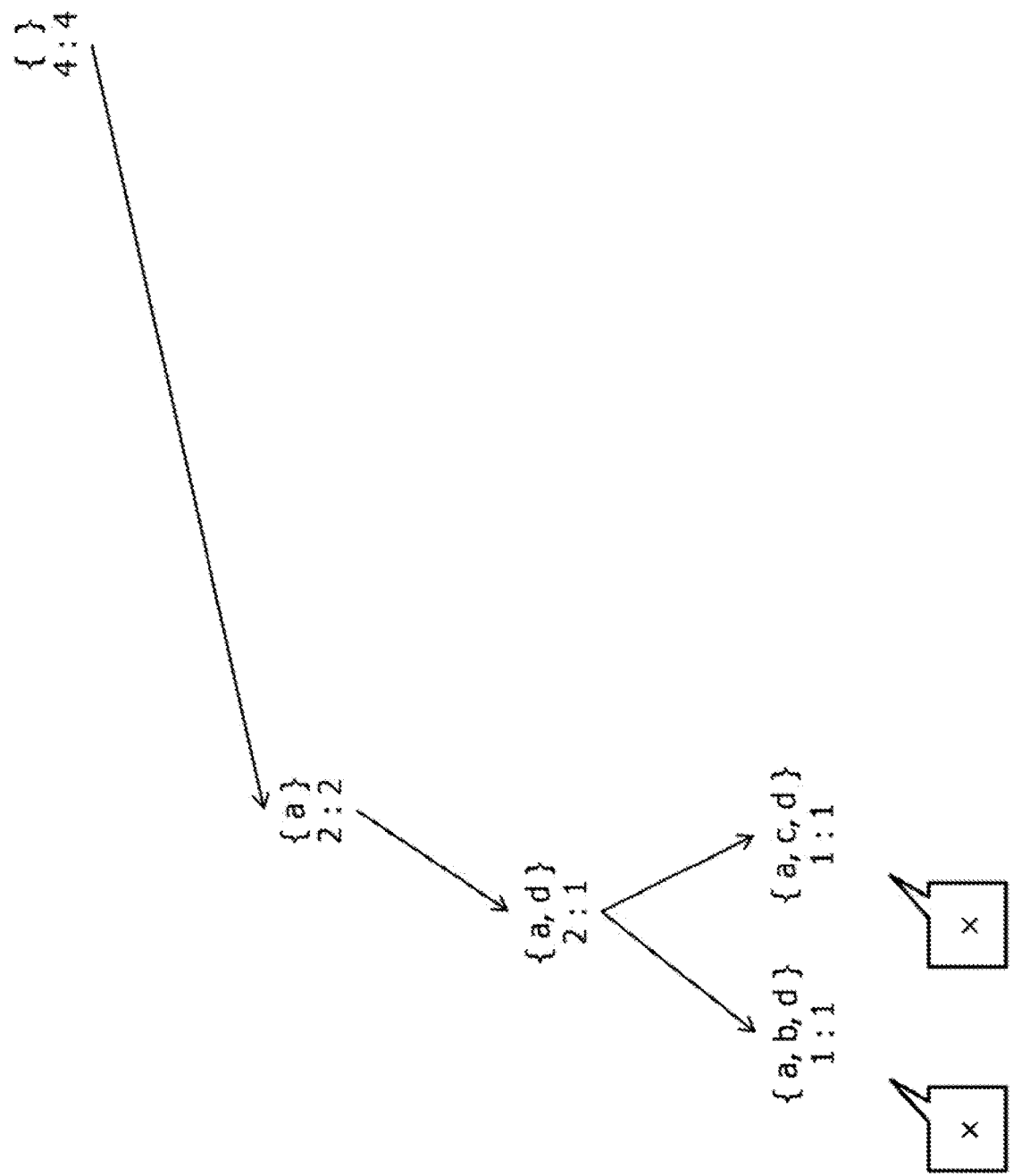
FIG. 19 is a diagram explaining a specific example of another pattern determination process described with reference to FIGS. 9 to 12.

Here, in the example illustrated in FIG. 19, the frequency of occurrence of positive examples and the frequency of occurrence of negative examples corresponding to "none" are both "4". Therefore, the pattern determination unit 114 determines that "none" is not an emerging pattern in the process in S63.

(Search for Attribute Pattern that Includes "a")

Next, in the process (re-designation process) in S74, the pattern determination unit 114 re-designates the priority ranks of each attribute included in the plurality of attribute patterns in the order of "a", "b", "c", and "d". Then, in the process in S75, the pattern determination unit 114 specifies "a", which is an attribute pattern corresponding to the next place in the search order, in accordance with the priority ranks of each attribute. In addition, as illustrated in FIG. 19, the pattern determination unit 114 associates the specified "a" with the child node corresponding to the root node, for example.

Here, in the example illustrated in FIG. 19, "2", which is the frequency of occurrence of negative examples of the node corresponding to "a", is decreased from "4", which is the frequency of occurrence of negative examples of the node corresponding to "none". Therefore, the pattern determination unit 114 performs a determination as to whether or not "a" is an emerging pattern in the process in S81. Specifically, in the example illustrated in FIG. 19, the frequency of occurrence of positive examples and the frequency of occurrence of negative examples corresponding to "a" are both "2". Therefore, the pattern determination unit 114 determines that "a" is not an emerging pattern in the process in S83.

(Search for Attribute Pattern that Includes "a" and "d")

Next, in the process in S74, the pattern determination unit 114 specifies "a, b" as an attribute pattern corresponding to the next place in the search order, in accordance with "a", "b", "c", and "d", which are the priority ranks of each attribute designated (re-designated) immediately before. Then, the pattern determination unit 114 specifies "a" as an attribute pattern including an attribute except the attribute with the lowest priority rank among the attributes included in the specified attribute pattern.

Subsequently, in the process in S74, the pattern determination unit 114 specifies samples corresponding to each of the third row and the fourth row as samples including "a", which is the specified attribute pattern, among the samples included in the data set DN described with reference to FIG. 18B. Then, as illustrated in FIG. 20A, the pattern determination unit 114 specifies "b" and "c", which are attributes with lower priority ranks than "a" among the attributes included in the sample corresponding to the third row. In addition, as illustrated in FIG. 20A, the pattern determination unit 114 specifies "b", "c", and "d", which are attributes with lower priority ranks than "a" among the attributes included in the sample corresponding to the fourth row. Furthermore, the pattern determination unit 114 re-designates the priority ranks of each specified attribute in the order of "d", "b", and "c".

Thereafter, in the process in S75, the pattern determination unit 114 specifies "a, d" as an attribute pattern corresponding to the next place in the search order, in accordance with the priority ranks ("b", "c", and "d") of each attribute including "b", "c", and "d". In addition, as illustrated in FIG. 19, the pattern determination unit 114 associates the specified "a, d" with the child node corresponding to "a", for example.

Here, in the example illustrated in FIG. 19, "1", which is the frequency of occurrence of negative examples of the node corresponding to "a, d", is decreased from "2", which is the frequency of occurrence of negative examples of the node corresponding to "a". Therefore, the pattern determination unit 114 performs a determination as to whether or not "a, d" is an emerging pattern in the process in S81. Specifically, in the example illustrated in FIG. 19, the frequency of occurrence of positive examples and the frequency of occurrence of negative examples corresponding to "a, d" are "2" and "1", respectively. Therefore, the pattern determination unit 114 determines that "a, d" is not an emerging pattern in the process in S83.

(Search for Attribute Pattern that Includes "a", "b", and "d")

Next, in the process in S74, the pattern determination unit 114 specifies "a, b, d" as an attribute pattern corresponding to the next place in the search order, in accordance with "d", "b", and "c", which are the priority ranks of each attribute designated (re-designated) immediately before. Then, the pattern determination unit 114 specifies "a, d" as an attribute pattern including attributes except the attribute with the lowest priority rank among the attributes included in the specified attribute pattern.

Subsequently, in the process in S74, the pattern determination unit 114 specifies a sample corresponding to the fourth row as a sample including "a, d", which is an attribute pattern, among the samples included in the data set DN described with reference to FIG. 18B. Then, as illustrated in FIG. 20B, the pattern determination unit 114 specifies "b" and "c", which are attributes with lower priority ranks than "d" among the attributes included in the sample corresponding to the fourth row. Furthermore, the pattern determination unit 114 re-designates the priority ranks of each specified attribute in the order of "b" and "c".

Thereafter, in the process in S75, the pattern determination unit 114 specifies "a, b, d" as an attribute pattern corresponding to the next place in the search order, in accordance with the re-designated priority ranks of each attribute. In addition, as illustrated in FIG. 19, the pattern determination unit 114 associates the specified "a, b, d" with the child node corresponding to "a, d", for example.

Here, in the example illustrated in FIG. 19, "1", which is the frequency of occurrence of negative examples of the node corresponding to "a, b, d", is not decreased from "1", which is the frequency of occurrence of negative examples of the node corresponding to "a, d". Therefore, the pattern determination unit 114 chooses not to perform a determination as to whether or not "a, b, d" is an emerging pattern in the process in S82.

(Search for Attribute Pattern that Includes "a", "c", and "d")

Next, in the process in S75, the pattern determination unit 114 specifies "a, c, d" as an attribute pattern corresponding to the next place in the search order, in accordance with the already designated priority ranks ("b" and "c") of each attribute including "b" and "c". In addition, as illustrated in FIG. 19, the pattern determination unit 114 associates the specified "a, c, d" with the second child node corresponding to "a, d", for example.

Here, in the example illustrated in FIG. 19, "1", which is the frequency of occurrence of negative examples of the node corresponding to "a, c, d", is not decreased from "1", which is the frequency of occurrence of negative examples of the node corresponding to "a, d". Therefore, the pattern determination unit 114 chooses not to perform a determination as to whether or not "a, c, d" is an emerging pattern in the process in S82.

(Search for Attribute Pattern that Includes "a" and "b")

Next, in the process in S75, the pattern determination unit 114 specifies "a, b" as an attribute pattern corresponding to the next place in the search order, in accordance with the already designated priority ranks ("d", "b", and "c") of each attribute including "b", "c", and "d". In addition, as illustrated in FIG. 21, the pattern determination unit 114 associates the specified "a, b" with the second child node corresponding to "a", for example.

Figure 21:
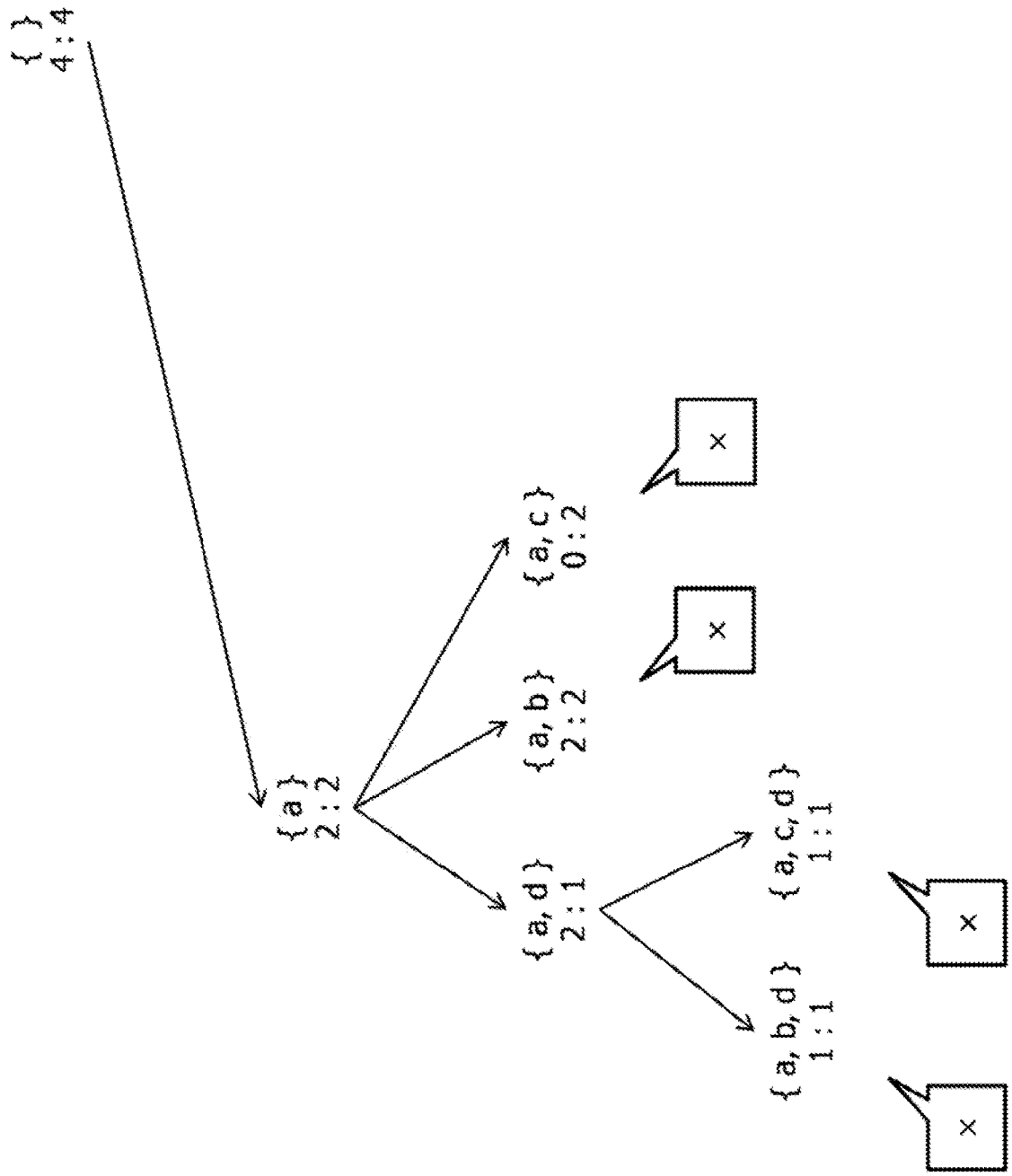
FIG. 21 is a diagram explaining a specific example of the another pattern determination process described with reference to FIGS. 9 to 12.

Here, in the example illustrated in FIG. 21, "2", which is the frequency of occurrence of negative examples of the node corresponding to "a, b", is not decreased from "2", which is the frequency of occurrence of negative examples of the node corresponding to "a". Therefore, the pattern determination unit 114 chooses not to perform a determination as to whether or not "a, b" is an emerging pattern in the process in S82.

(Search for Attribute Pattern that Includes "a" and "c")

Next, in the process in S75, the pattern determination unit 114 specifies "a, c" as an attribute pattern corresponding to the next place in the search order, in accordance with the already designated priority ranks ("d", "b", and "c") of each attribute including "b", "c", and "d". In addition, as illustrated in FIG. 21, the pattern determination unit 114 associates the specified "a, c" with the third child node corresponding to "a", for example.

Here, in the example illustrated in FIG. 21, "2", which is the frequency of occurrence of negative examples of the node corresponding to "a, c", is not decreased from "2", which is the frequency of occurrence of negative examples of the node corresponding to "a". Therefore, the pattern determination unit 114 chooses not to perform a determination as to whether or not "a, c" is an emerging pattern in the process in S82.

(Search for Attribute Pattern that Includes "b")

Next, in the process in S75, the pattern determination unit 114 specifies "b" as an attribute pattern corresponding to the next place in the search order, in accordance with the already designated priority ranks ("a", "b", "c", and "d") of each attribute including "a", "b", "c", and "d". In addition, as illustrated in FIG. 22, the pattern determination unit 114 associates the specified "b" with the second child node corresponding to "none", for example.

Figure 22:
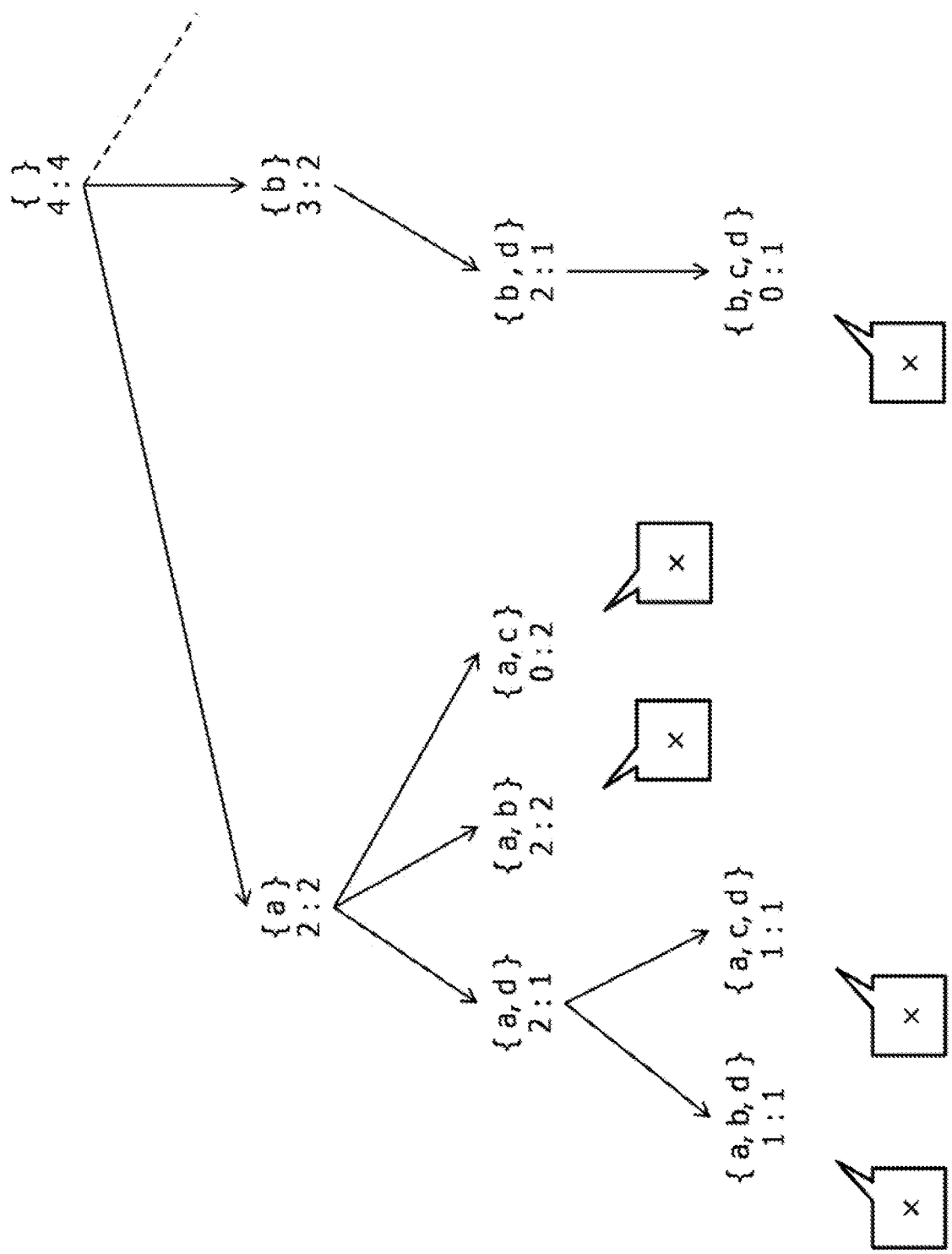
FIG. 22 is a diagram explaining a specific example of the another pattern determination process described with reference to FIGS. 9 to 12.

Here, in the example illustrated in FIG. 22, "2", which is the frequency of occurrence of negative examples of the node corresponding to "b", is decreased from "4", which is the frequency of occurrence of negative examples of the node corresponding to "none". Therefore, the pattern determination unit 114 performs a determination as to whether or not "b" is an emerging pattern in the process in S81. Specifically, in the example illustrated in FIG. 22, the frequency of occurrence of positive examples and the frequency of occurrence of negative examples corresponding to "b" are "3" and "2", respectively. Therefore, the pattern determination unit 114 determines that "b" is not an emerging pattern in the process in S83.

(Search for Attribute Pattern that Includes "b" and "d")

Next, in the process in S74, the pattern determination unit 114 specifies "b, c" as an attribute pattern corresponding to the next place in the search order, in accordance with the already designated priority ranks ("a", "b", "c", and "d") of each attribute including "a", "b", "c", and "d". Then, the pattern determination unit 114 specifies "b" as an attribute pattern including an attribute except the attribute with the lowest priority rank among the attributes included in the specified attribute pattern.

Subsequently, in the process in S74, the pattern determination unit 114 specifies samples corresponding to each of the third row and the fourth row as samples including "b", which is an attribute pattern, among the samples included in the data set DN described with reference to FIG. 18B. Then, as illustrated in FIG. 23A, the pattern determination unit 114 specifies "c", which is an attribute with a lower priority rank than "b" among the attributes included in the sample corresponding to the third row. In addition, as illustrated in FIG. 23A, the pattern determination unit 114 specifies "c" and "d", which are attributes with lower priority ranks than "b" among the attributes included in the sample corresponding to the fourth row. Furthermore, the pattern determination unit 114 designates the priority ranks of each specified attribute in the order of "d" and "c".

Thereafter, in the process in S75, the pattern determination unit 114 specifies "b, d" as an attribute pattern corresponding to the next place in the search order, in accordance with the re-designated priority ranks of each attribute. In addition, as illustrated in FIG. 22, the pattern determination unit 114 associates the specified "b, d" with the child node corresponding to "b", for example.

Here, in the example illustrated in FIG. 22, "1", which is the frequency of occurrence of negative examples of the node corresponding to "b, d", is decreased from "2", which is the frequency of occurrence of negative examples of the node corresponding to "b". Therefore, the pattern determination unit 114 performs a determination as to whether or not "b, d" is an emerging pattern in the process in S81. Specifically, in the example illustrated in FIG. 22, the frequency of occurrence of positive examples and the frequency of occurrence of negative examples corresponding to "b, d" are "2" and "1", respectively. Therefore, the pattern determination unit 114 determines that "b, d" is not an emerging pattern in the process in S83.

(Search for Attribute Pattern that Includes "b", "c", and "d")

Next, in the process in S74, the pattern determination unit 114 specifies "b, c, d" as an attribute pattern corresponding to the next place in the search order, in accordance with "d" and "c", which are the priority ranks of each attribute designated (re-designated) immediately before. Then, the pattern determination unit 114 specifies "b, d" as an attribute pattern including attributes except the attribute with the lowest priority rank among the attributes included in the specified attribute pattern.

Subsequently, in the process in S74, the pattern determination unit 114 specifies a sample corresponding to the fourth row as a sample including "b, d", which is an attribute pattern, among the samples included in the data set DN described with reference to FIG. 18B. Then, as illustrated in FIG. 23B, the pattern determination unit 114 specifies "c", which is an attribute with a lower priority rank than "d" among the attributes included in the sample corresponding to the fourth row.

Thereafter, the pattern determination unit 114 specifies "b, c, d" as an attribute pattern corresponding to the next place in the search order in the process in S75. In addition, as illustrated in FIG. 22, the pattern determination unit 114 associates the specified "b, c, d" with the child node corresponding to "b, d", for example.

Here, in the example illustrated in FIG. 22, "1", which is the frequency of occurrence of negative examples of the node corresponding to "b, c, d", is not decreased from "1", which is the frequency of occurrence of negative examples of the node corresponding to "b, d". Therefore, the pattern determination unit 114 chooses not to perform a determination as to whether or not "b, c, d" is an emerging pattern in the process in S82.

(Search for Attribute Pattern that Includes "b" and "c")

Next, in the process in S75, the pattern determination unit 114 specifies "b, c" as an attribute pattern corresponding to the next place in the search order, in accordance with the already designated priority ranks ("a", "b", "c", and "d") of each attribute including "a", "b", "c", and "d". In addition, as illustrated in FIG. 24, the pattern determination unit 114 associates the specified "b, c" with the second child node corresponding to "d", for example.

Figure 24:
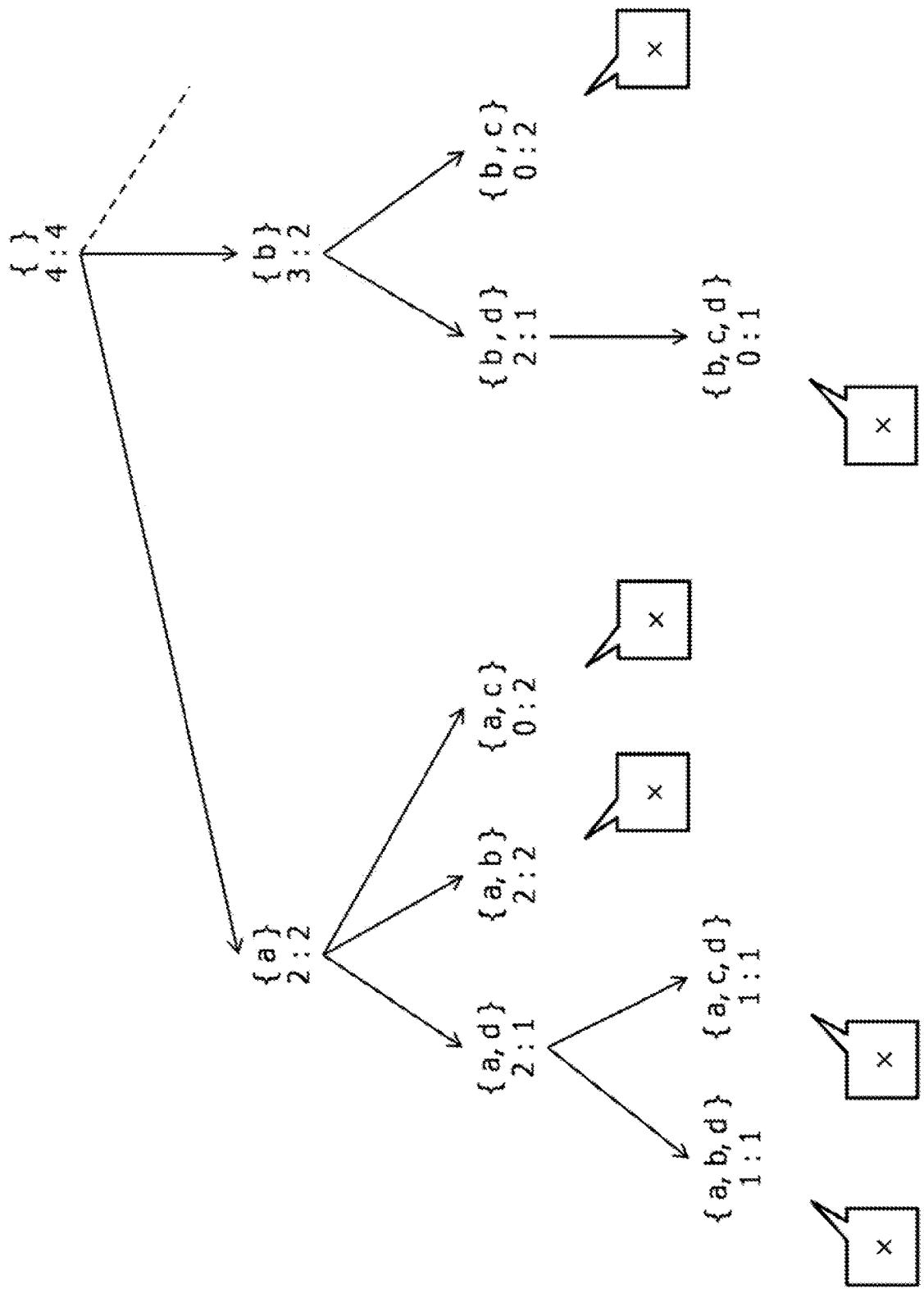
FIG. 24 is a diagram explaining a specific example of the another pattern determination process described with reference to FIGS. 9 to 12.

Here, in the example illustrated in FIG. 24, "2", which is the frequency of occurrence of negative examples of the node corresponding to "b, c", is not decreased from "2", which is the frequency of occurrence of negative examples of the node corresponding to "b". Therefore, the pattern determination unit 114 chooses not to perform a determination as to whether or not "b, c" is an emerging pattern in the process in S82.

As described above, the information processing device 1 in the present embodiment designates the priority ranks of each of attributes included in a plurality of attribute patterns, based on the inclusion relationship between the occurrence sets of a plurality of samples with respect to each of the attributes included in the plurality of attribute patterns. Then, the information processing device 1 performs a determination as to whether or not each of the plurality of attribute patterns is an emerging pattern, in accordance with a search order based on the designated priority ranks.

Here, each time a determination as to whether or not each attribute pattern is an emerging pattern is performed, the information processing device 1 determines whether or not the frequency of occurrence of the plurality of samples in a first attribute pattern (an attribute pattern for which the determination is to be performed next) is decreased from the frequency of occurrence of the plurality of samples in a second attribute pattern (an attribute pattern that has all the attributes except an attribute with the lowest priority rank among the attributes included in the first attribute pattern). Then, when it is determined that the frequency of occurrence corresponding to the first attribute pattern is not decreased from the frequency of occurrence corresponding to the second attribute pattern, the information processing device 1 does not perform the determination for the first attribute pattern.

For example, when the frequency of occurrence of the first attribute pattern is not decreased from the frequency of occurrence of the second attribute pattern, the information processing device 1 in the present embodiment determines that the first attribute pattern is not a minimal emerging pattern. Therefore, when the processing purpose is to extract the minimal emerging pattern, in response to the detection of the fact that the frequency of occurrence of the first attribute pattern is not decreased from the frequency of occurrence of the second attribute pattern, the information processing device 1 omits to make a determination for the first attribute pattern.

Furthermore, the information processing device 1 in the present embodiment rearranges each attribute included in the plurality of attribute patterns in advance in order to create a large number of first attribute patterns for which it is feasible to omit making a determination as described above.

This allows the information processing device 1 to reduce the calculation processing cost involved in extracting the emerging pattern. Specifically, the information processing device 1 may reduce the calculation processing cost involved in extracting the minimal emerging pattern.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a pattern search program that causes at least one computer to execute a process, the process comprising:

constantly monitoring a communication device of the at least one computer to detect whether the communication device receives an instruction signal from an operation terminal via a network;

in response to the received instruction signal, dynamically determining a priority rank for each attribute included in a plurality of attribute patterns stored in a memory, each of the plurality of attribute patterns including a combination of one or more attributes, the dynamically determining of the priority rank being performed for each attribute based on an inclusion relationship between occurrence sets of a negative sample of a plurality of samples with respect to each of the attributes included in the plurality of attribute patterns;

in response to the priority rank determined for each attribute, dynamically determining, for a first attribute pattern being each attribute pattern of the plurality of attribute patterns, whether a frequency of occurrence of the plurality of samples in the first attribute pattern is less than the frequency of occurrence of the plurality of samples in a second attribute pattern that has all the attributes except one of the attributes with lowest one of the priority ranks among the attributes included in the first attribute pattern;

when the frequency of occurrence of the plurality of samples in the first attribute pattern is less than the frequency of occurrence of the plurality of samples in the second attribute pattern, performing determination of an emerging pattern on the first attribute pattern by determining whether the first attribute pattern is an emerging pattern in accordance with a search order based on priority ranks obtained by the dynamically determined for attributes included in the first attribute pattern;

when the frequency of occurrence of the plurality of samples in the first attribute pattern is not less than the frequency of occurrence of the plurality of samples in the second attribute pattern, excluding the first attribute pattern from a processing target of the determination of the emerging pattern; and when the first attribute pattern is determined as the emerging pattern by the performing of the determination of the emerging pattern, automatically storing, among the plurality of attribute patterns, the first attribute pattern as the emerging pattern in the memory.

2. The non-transitory computer-readable storage medium according to claim 1, wherein the determining of the priority rank includes:

generating directed edges toward the attributes of which the occurrence sets are larger from the attributes of which the occurrence sets are smaller, separately for every two attributes that have the inclusion relationship;

generating a directed acyclic graph from each of the generated directed edges; and designating the priority ranks of each of the attributes included in the plurality of attribute patterns, based on the generated directed acyclic graph.

3. The non-transitory computer-readable storage medium according to claim 2, wherein the determining of the priority rank includes designating the priority ranks of each of the attributes included in the plurality of attribute patterns by referring to the directed acyclic graph so that the attributes at output sources are put at more preceding places in an order than the attributes at output destinations in each of the directed edges.

4. The non-transitory computer-readable storage medium according to claim 3, wherein in the performing of the determination of the emerging pattern, the search order is determined based on the dynamically determined priority ranks so that the attributes included in the first attribute pattern are put in a lexicographic order according to the priority ranks.

5. The non-transitory computer-readable storage medium according to claim 4, wherein the plurality of attribute patterns includes an attribute pattern that does not include any of the attributes, wherein in the performing of the determination of the emerging pattern, selecting as the first attribute pattern, the attribute pattern that does not include any of the attributes, earlier than remaining attribute patterns of the plurality of attribute patterns.

6. The non-transitory computer-readable storage medium according to claim 1, wherein the determining of the priority rank includes designating the priority ranks of each of the attributes included in the plurality of attribute patterns, based on the frequency of occurrence of the negative sample of the plurality of samples with respect to each of the attributes included in the plurality of attribute patterns.

7. The non-transitory computer-readable storage medium according to claim 6, wherein the determining of the priority rank includes designating the priority ranks of each of the attributes included in the plurality of attribute patterns such that the attributes with the frequency of occurrence of the plurality of samples that is higher have the priority ranks that are higher.

8. The non-transitory computer-readable storage medium according to claim 1, wherein the performing of determination of the emerging pattern includes, when the frequency of occurrence of the plurality of samples in the first attribute pattern is decreased from the frequency of occurrence of the plurality of samples in the second attribute pattern, determining for other attribute patterns obtained by adding another attribute to the first attribute pattern.

9. The non-transitory computer-readable storage medium according to claim 1, wherein
the performing of determination of the emerging pattern includes re-designating the first attribute pattern each time the determination is performed.

10. The non-transitory computer-readable storage medium according to claim 9, wherein
the performing of determination of the emerging pattern includes:
specifying one or more of the samples that correspond to one of the occurrence sets of the second attribute pattern among the plurality of samples;
specifying one or more of the attributes with the priority ranks that are lower than the priority ranks of each of the attributes included in the second attribute pattern, among the attributes included in the plurality of attribute patterns, for each of the specified one or more of the samples;
re-designating the priority ranks of the specified one or more of the attributes, based on the inclusion relationship between the occurrence sets of the one or more of the samples with respect to the one or more of the attributes; and
re-designating the first attribute pattern in accordance with the search order based on the re-designated priority ranks.

11. A pattern search device comprising:
a communication device;
one or more memories; and
one or more processors coupled to the one or more memories and the communication device, the one or more processors being configured to perform processing including:
constantly monitoring a communication device of the at least one computer to detect whether the communication device receives an instruction signal from an operation terminal via a network;
in response to the received instruction signal, dynamically determining a priority rank for each attribute included in a plurality of attribute patterns stored in a memory, each of the plurality of attribute patterns including a combination of one or more attributes, the dynamically determining of the priority rank being performed for each attribute based on an inclusion relationship between occurrence sets of a negative sample of a plurality of samples with respect to each of the attributes included in the plurality of attribute patterns;
in response to the priority rank determined for each attribute, dynamically determining, for a first attribute pattern being each attribute pattern of the plurality of attribute patterns, whether a frequency of occurrence of the plurality of samples in the first attribute pattern is less than the frequency of occurrence of the plurality of samples in a second attribute pattern that has all the attributes except one of the attributes with lowest one of the priority ranks among the attributes included in the first attribute pattern;
when the frequency of occurrence of the plurality of samples in the first attribute pattern is less than the frequency of occurrence of the plurality of samples in the second attribute pattern, performing determination of an emerging pattern on the first attribute pattern by determining whether the first attribute pattern is an emerging pattern in accordance with a search order based on priority ranks obtained by the dynamically determined for attributes included in the first attribute pattern;
when the frequency of occurrence of the plurality of samples in the first attribute pattern is not less than the frequency of occurrence of the plurality of samples in the second attribute pattern, excluding the first attribute pattern from a processing target of the determination of the emerging pattern; and
when the first attribute pattern is determined as the emerging pattern by the performing of the determination of the emerging pattern, automatically storing, among the plurality of attribute patterns, the first attribute pattern as the emerging pattern in the memory.

12. A pattern search method for a computer to execute a process comprising:
constantly monitoring a communication device of the at least one computer to detect whether the communication device receives an instruction signal from an operation terminal via a network;
in response to the received instruction signal, dynamically determining a priority rank for each attribute included in a plurality of attribute patterns stored in a memory, each of the plurality of attribute patterns including a combination of one or more attributes, the dynamically determining of the priority rank being performed for each attribute based on an inclusion relationship between occurrence sets of a negative sample of a plurality of samples with respect to each of the attributes included in the plurality of attribute patterns;
in response to the priority rank determined for each attribute, dynamically determining, for a first attribute pattern being each attribute pattern of the plurality of attribute patterns, whether a frequency of occurrence of the plurality of samples in the first attribute pattern is less than the frequency of occurrence of the plurality of samples in a second attribute pattern that has all the attributes except one of the attributes with lowest one of the priority ranks among the attributes included in the first attribute pattern;
when the frequency of occurrence of the plurality of samples in the first attribute pattern is less than the frequency of occurrence of the plurality of samples in the second attribute pattern, performing determination of an emerging pattern on the first attribute pattern by determining whether the first attribute pattern is an emerging pattern in accordance with a search order based on priority ranks obtained by the dynamically determined for attributes included in the first attribute pattern;
when the frequency of occurrence of the plurality of samples in the first attribute pattern is not less than the frequency of occurrence of the plurality of samples in the second attribute pattern, excluding the first attribute pattern from a processing target of the determination of the emerging pattern; and
when the first attribute pattern is determined as the emerging pattern by the performing of the determination of the emerging pattern, automatically storing, among the plurality of attribute patterns, the first attribute pattern as the emerging pattern in the memory.

* * * * *